US011797754B2

(12) United States Patent (10) Patent No.: US 11,797,754 B2
Martin et al. (45) Date of Patent: Oct. 24, 2023

(54) SYSTEMS AND METHODS FOR AUTOMATICALLY SCORING A GROUP OF DESIGN ELEMENTS

(71) Applicant: Canva Pty Ltd, Surry Hills (AU)

(72) Inventors: Tristan Lindsay Martin, Surry Hills (AU); Sam Luke Fancourt Parkinson, Surry Hills (AU)

(73) Assignee: CANVA PTY LTD, Surry Hills (AU)

( * ) Notice: Subject to any disclaimer, the term of this patent is extended or adjusted under 35 U.S.C. 154(b) by 0 days.

(21) Appl. No.: 17/993,944

(22) Filed: Nov. 24, 2022

(65) Prior Publication Data

US 2023/0169262 A1 Jun. 1, 2023

(30) Foreign Application Priority Data

Nov. 26, 2021 (AU) .............................. 2021273639

(51) Int. Cl.
*G06T 11/20* (2006.01)
*G06F 40/166* (2020.01)
*G06T 11/00* (2006.01)

(52) U.S. Cl.
CPC .......... *G06F 40/166* (2020.01); *G06T 11/001* (2013.01)

(58) Field of Classification Search
None
See application file for complete search history.

(56) References Cited

U.S. PATENT DOCUMENTS

| 7,536,048 B2* | 5/2009 | Moravec | G06T 11/001 |
| | | | 345/589 |
| 9,836,867 B2* | 12/2017 | Bostick | G06T 11/00 |
| 10,853,839 B1* | 12/2020 | Galep | G06Q 30/0244 |
| 2016/0093080 A1* | 3/2016 | Tumanov | G06T 11/60 |
| | | | 345/589 |
| 2019/0213238 A1* | 7/2019 | Batra | G06F 40/186 |
| 2019/0340791 A1* | 11/2019 | Hill | G06F 8/38 |
| 2021/0279377 A1* | 9/2021 | Kuniavsky | G06F 40/186 |
| 2021/0407155 A1* | 12/2021 | Martin | G06T 11/60 |
| 2022/0215606 A1* | 7/2022 | Radford | G06F 40/103 |

OTHER PUBLICATIONS

Guarav Sharma, The CIEDE2000 Color-Difference Formula: Implementation Notes, Supplementary Test Data, and Mathematical Observations, Color Research adn Application, vol. 30, No. 1, pp. 21-30, Feb. 2005.

* cited by examiner

*Primary Examiner* — Maikhanh Nguyen
(74) *Attorney, Agent, or Firm* — GrowIP Law Group LLC

(57) ABSTRACT

Described herein is a computer implemented method. The method includes: accessing design data defining one or more design elements of a design; determining a set of target elements, the set of target elements including one or more of the design elements; determining a set of fragments, the set of fragments including one or more primary fragments and one or more background fragments, each primary fragment being a fragment of a design element in the set of target elements, each secondary fragment being a fragment that is a background fragment to a primary fragment; calculating, by a processing unit, a set of fragment contrast scores, the set of fragment contrast scores including a fragment contrast score for each primary fragment in the set of fragments; and calculating an overall score for the set of target elements based on the set of fragment contrast scores.

14 Claims, 10 Drawing Sheets

SYSTEMS AND METHODS FOR AUTOMATICALLY SCORING A GROUP OF DESIGN ELEMENTS

CROSS-REFERENCE TO RELATED APPLICATION

This application is a U.S. Non-Provisional application that claims priority to Australian Patent Application No. 2021273639, filed Nov. 26, 2021, which is hereby incorporated by reference in its entirety.

TECHNICAL FIELD

Aspects of the present disclosure are directed to systems and methods for automatically scoring a group of design elements

BACKGROUND

Various computer applications for creating and publishing graphic designs exist. Generally speaking, such applications allow users to create a design by, for example, creating a page and adding elements to that page.

Once a design element has been added to a page, applications typically provide mechanisms by which a user can modify the element—for example by selecting the element (or a part thereof) and changing its colour.

SUMMARY

Described herein is a computer implemented method including: accessing design data defining one or more design elements of a design; determining a set of target elements, the set of target elements including one or more of the design elements; determining a set of fragments, the set of fragments including one or more primary fragments and one or more background fragments, each primary fragment being a fragment that is directly associated with a design element in the set of target elements, each secondary fragment being a fragment that is a background fragment to a primary fragment; calculating, by a processing unit, a set of fragment contrast scores, the set of fragment contrast scores including a fragment contrast score for each primary fragment in the set of fragments; and calculating an overall score for the set of target elements based on the set of fragment contrast scores.

Figure 1:
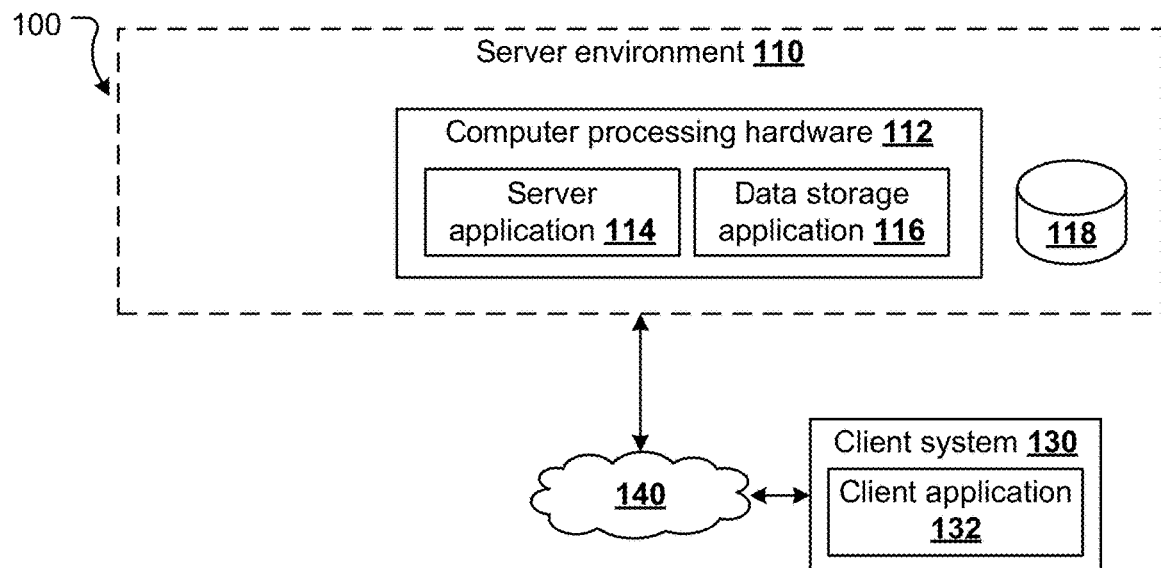
FIG. 1 is a diagram depicting a networked environment in which various features of the present disclosure may be implemented.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

As discussed above, computer applications for use in creating graphic designs are known. Such applications will typically provide mechanisms for a user to create a design and modify elements of a design. One way of modifying a design is to change the colour of one or more of the design's elements (or one or more design element parts). In many applications, manually changing the colour of a design element (or part thereof) generally involves selecting the element(s)/element part(s) in question then selecting a new colour for those element(s)/element part(s).

As designs become more complex, however, colour modification can become a complex exercise. For example, where a design has many elements manually recolouring the design may be a time consuming and tedious process. Furthermore, for many users recolouring elements in a way that provides an overall design that is cohesive and (ideally) visually appealing may require expertise they do not possess.

To address such issues, the present disclosure provides mechanisms for automatically recolouring a design.

The present disclosure also provides mechanisms for scoring designs, design elements, and/or groups of design elements and, based on such scores, providing user feedback where a design/element/group of design elements may be problematic.

The embodiments described below are discussed with respect to a graphic design platform which includes server- and client-side applications which operate together to perform the processing described herein. This platform will be described with reference to networked environment 100 of FIG. 1.

Networked environment 100 includes a server environment 110 and a client system 130 which communicate via one or more communications networks 140 (e.g. the Internet).

Generally speaking, the server environment 110 includes computer processing hardware 112 (discussed below) on which applications that provide server-side functionality to client applications such as client application 132 (described below) execute. In the present example, server environment 110 includes a server application 114 (which may also be referred to as a front end server application) and a data storage application 116.

The server application 114 executes to provide a client application endpoint that is accessible over communications network 140. To do so, the server application 114 may include one or more application programs, libraries, APIs or other software elements that implement the features and functions that are described herein. For example, where server application 114 serves web browser client applications the server application 114 will be a web server which receives and responds to, for example, HTTP requests. Where server application 114 serves native client applications, server application 114 will be an application server configured to receive, process, and respond to specifically defined API calls received from those client applications.

The server environment 110 may include both web server and application server applications allowing it to interact with both web and native client applications.

In the present example the server environment 110 (e.g. server application 114 alone or in conjunction with client application 132) services/functions related to creating, editing, and publishing designs. This may include, for example, functions such as design creation, design editing, design saving, design sharing/publication, and/or other relevant functions. In addition, the server application 114 (alone or in conjunction with other applications) may provide additional functions that are typically provided by server systems—for example user account creation and management, user authentication, and/or other server side functions.

The data storage application 116 executes to receive and process requests to persistently store and retrieve data relevant to the operations performed/services provided by the server environment 110. Such requests may be received from the server application 114, other server environment applications, and/or (in some instances) directly from client applications such as 132. Data relevant to the operations performed/services provided by the server environment 110 may include, for example, user account data, user design data (i.e. data describing designs that have been created by users), design template data (e.g. templates that can be used by users to create designs), design element data (e.g. data in respect of stock elements that users may add to designs), data in respect of one or more predefined colour palettes, and/or other data relevant to the operation of the server application 114 as described below.

The data storage application 116 may, for example, be a relational database management application or an alternative application for storing and retrieving data from data storage 118. Data storage 118 may be any appropriate data storage device (or set of devices), for example one or more non transient computer readable storage devices such as hard disks, solid state drives, tape drives, or alternative computer readable storage devices.

In server environment 110, server application 114 persistently stores data to data storage device 118 via the data storage application 116. In alternative implementations, however, the server application 114 may be configured to directly interact with data storage devices such as 118 to store and retrieve data (in which case a separate data storage application may not be needed). Furthermore, while a single data storage application 116 is described, server environment 110 may include multiple data storage applications. For example one data storage application 116 may be used for user account data, another for user design data, another for design element data and so forth. In this case, each data storage application may interface with one or more shared data storage devices and/or one or more dedicated data storage devices, and each data storage application may receive/respond to requests from various server-side and/or client-side applications (including, for example server application 114).

As noted, the server application 114 and data storage application 116 run on (or are executed by) computer processing hardware 112. Computer processing hardware 112 includes one or more computer processing systems. The precise number and nature of those systems will depend on the architecture of the server environment 110.

For example, in one implementation a single server application 114 runs on its own computer processing system and a single data storage application 116 runs on a separate computer processing system. In another implementation, a single server application 114 and a single data storage application 116 run on a common computer processing system. In yet another implementation, server environment 110 may include multiple server applications running in parallel (on one or multiple computer processing systems).

In a further implementation, server environment 110 is a scalable environment in which application instances (and the computer processing hardware 112—i.e. the specific computer processing systems required to run those instances) are commissioned and decommissioned according to demand—e.g. in a public or private cloud-type system. In this case, server environment 110 may simultaneously run multiple server applications 114 and/or multiple data storage applications 116 (on one or multiple computer processing systems) as required by client demand. Where sever environment 110 is a scalable system it will include additional applications to those illustrated and described. As one example, the server environment 110 may include a load balancing application which operates to determine demand, direct client traffic to the appropriate server application instance 114 (where multiple server applications 114 have been commissioned), trigger the commissioning of additional server environment applications (and/or computer processing systems to run those applications) if required to meet the current demand, and/or trigger the decommissioning of server environment applications (and computer processing systems) if they are not functioning correctly and/or are not required for current demand.

Communication between the applications and computer processing systems of the server environment 110 may be by any appropriate means, for example direct communication or networked communication over one or more local area networks, wide area networks, and/or public networks (with a secure logical overlay, such as a VPN, if required).

The present disclosure describes various operations that are performed by applications of the server environment 110. Generally speaking, however, operations described as being performed by a particular application (e.g. server application 114) could be performed by one or more alternative applications, and/or operations described as being performed by multiple separate applications could in some instances be performed by a single application.

Client system 130 hosts a client application 132 which, when executed by the client system 130, configures the client system 132 to provide client-side functionality/interact with sever environment 110 (or, more specifically, the server application 114 and/or other applications provided by the server environment 110). Via the client application 132, a user can perform various operations such as creating, editing, saving, retrieving/accessing, publishing, and sharing documents. Such operations may be performed solely by client application 132, or may involve the client application 132 communicating with the server environment 110 for processing to be performed there (e.g. by the server application 114).

The client application 132 may be a general web browser application which accesses the server application 114 via an appropriate uniform resource locator (URL) and communicates with the server application 114 via general world-wide-web protocols (e.g. http, https, ftp). Alternatively, the client application 132 may be a native application programmed to communicate with server application 114 using defined application programming interface (API) calls and responses.

A given client system such as 130 may have more than one client application 132 installed and executing thereon. For example, a client system 130 may have a (or multiple) general web browser application(s) and a native client application.

In present disclosure describes methods and processing as being performed by client application 132. In certain embodiments, the functionality described may be natively provided by the client application 132 (e.g. the client application 132 itself has instructions and data which, when executed, cause the client application 132 to perform the functionality described herein).

In alternative embodiments, the functionality described herein may be provided by a separate software module (such as an add-on or plug-in) that operates in conjunction with the client application 132 to expand the functionality thereof.

In still further alternative embodiments, the functionality describe herein may be provided by a separate application which communicates with the client application 132 as required—for example to receive data required to perform the processing and communicate the output generated by the processing. The separate application may run on client system 130 or on an alternative computer processing system. As one example, the separate application may be sever application 114 (or an alternative application running at server environment 110 or at an alternative server environment).

The techniques and operations described herein are performed by one or more computer processing systems.

By way of example, client system 130 may be any computer processing system which is configured (or configurable) by hardware and/or software—e.g. client application 132—to offer client-side functionality. A client system 130 may be a desktop computer, laptop computer, tablet computing device, mobile/smart phone, or other appropriate computer processing system.

Similarly, the applications of server environment 110 are also executed by one or more computer processing systems. Server environment computer processing systems will typically be server systems, though again may be any appropriate computer processing systems.

Figure 2:
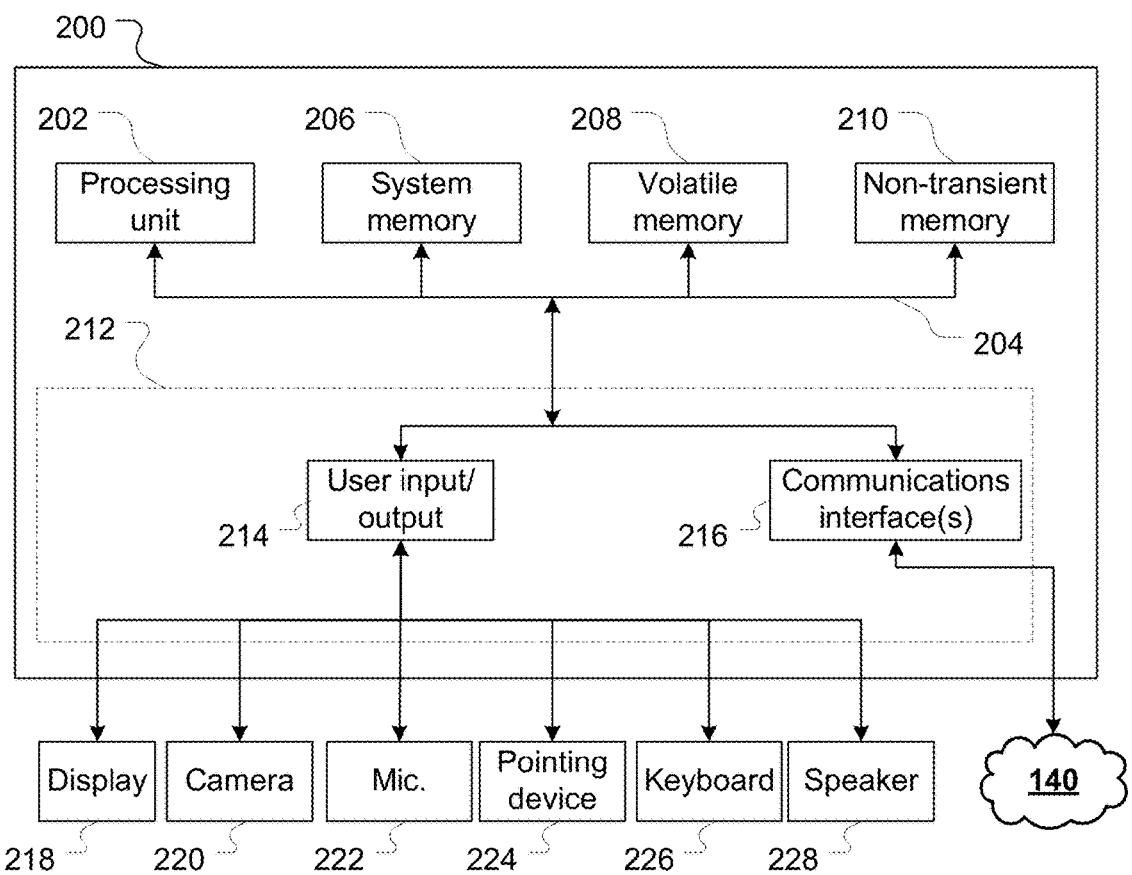
FIG. 2 is a block diagram of a computer processing system configurable to perform various features of the present disclosure.

FIG. 2 provides a block diagram of a computer processing system 200 configurable to implement embodiments and/or features described herein. System 200 is a general purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable by (either in a shared or dedicated manner) system 200.

Through a communications bus 204 the processing unit 202 is in data communication with a one or more machine readable storage (memory) devices which store computer readable instructions and/or data which are executed by the processing unit 202 to control operation of the processing system 200. In this example system 200 includes a system memory 206 (e.g. a BIOS), volatile memory 208 (e.g. random access memory such as one or more DRAM modules), and non-transient memory 210 (e.g. one or more hard disk or solid state drives).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols. For example, system 200 may be configured for wired connection with other devices/communications networks by one or more of: USB; eSATA; Ethernet; HDMI; and/or other wired connections.

Wireless connection with other devices/networks may similarly be by any appropriate standard or proprietary hardware and communications protocols. For example, system 200 may be configured for wireless connection with other devices/communications networks using one or more of: BlueTooth; WiFi; near field communications (NFC); Global System for Mobile Communications (GSM), and/or other wireless connections.

Generally speaking, and depending on the particular system in question, devices to which system 200 connects—whether by wired or wireless means—include one or more input devices to allow data to be input into/received by system 200 and one or more output device to allow data to be output by system 200. Example devices are described below, however it will be appreciated that not all computer processing systems will include all mentioned devices, and that additional and alternative devices to those mentioned may well be used.

For example, system 200 may include or connect to one or more input devices by which information/data is input into (received by) system 200. Such input devices may include keyboard, mouse, trackpad, microphone, accelerometer, proximity sensor, GPS, and/or other input devices. System 200 may also include or connect to one or more output devices controlled by system 200 to output information. Such output devices may include devices such as a display (e.g. a LCD, LED, touch screen, or other display device), speaker, vibration module, LEDs/other lights, and/or other output devices. System 200 may also include or connect to devices which may act as both input and output devices, for example memory devices (hard drives, solid state drives, disk drives, and/or other memory devices) which system 200 can read data from and/or write data to, and touch screen displays which can both display (output) data and receive touch signals (input).

By way of example, where system 200 is a client system such as 130 it may include a display 218 (which may be a touch screen display), a camera device 220, a microphone device 222 (which may be integrated with the camera device), a pointing device 224 (e.g. a mouse, trackpad, or other pointing device), a keyboard 226, and a speaker device 228.

System 200 also includes one or more communications interfaces 216 for communication with a network, such as network 140 of environment 100 (and/or a local network within the server environment 110). Via the communications interface(s) 216, system 200 can communicate data to and receive data from networked systems and/or devices.

System 200 may be any suitable computer processing system, for example, a server computer system, a desktop computer, a laptop computer, a netbook computer, a tablet computing device, a mobile/smart phone, a personal digital assistant, or an alternative computer processing system.

System 200 stores or has access to computer applications (also referred to as software or programs)—i.e. computer readable instructions and data which, when executed by the processing unit 202, configure system 200 to receive, process, and output data. Instructions and data can be stored on non-transient machine readable medium such as 210 accessible to system 200. Instructions and data may be transmitted to/received by system 200 via a data signal in a transmission channel enabled (for example) by a wired or wireless network connection over an interface such as communications interface 216.

Typically, one application accessible to system 200 will be an operating system application. In addition, system 200 will store or have access to applications which, when executed by the processing unit 202, configure system 200 to perform various computer-implemented processing operations described herein. For example, and referring to the networked environment of FIG. 1 above, server environment 110 includes one or more systems which run a server application 114, a data storage application 116. Similarly, client system 130 runs a client application 132.

In some cases part or all of a given computer-implemented method will be performed by system 200 itself, while in other cases processing may be performed by other devices in data communication with system 200.

Figure 3:
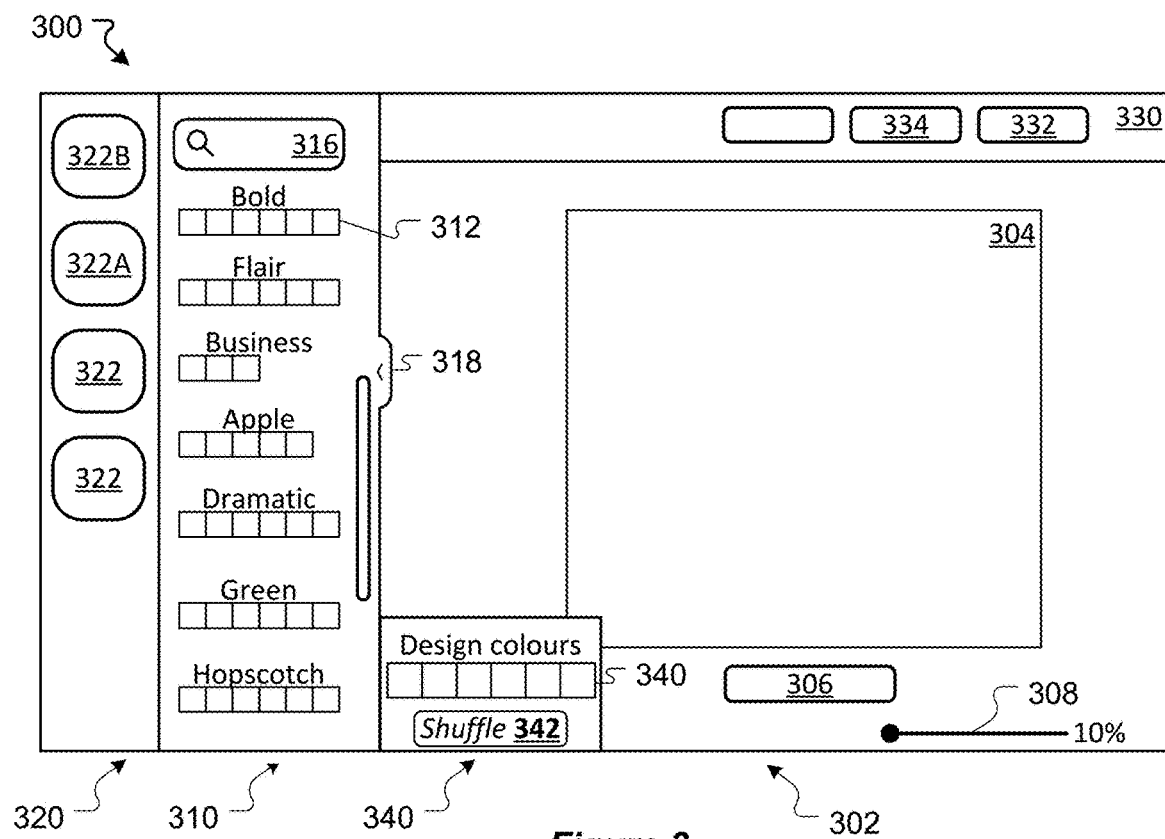
FIG. 3 depicts an example design creation graphical user interface.

In the present disclosure, the client application 132 configures the client system to provide a design creation user interface. Generally speaking, a design creation UI will allow a user to create, edit, and output designs. To illustrate the types of features that client application 132 may provide, FIG. 3 provides one example of a design creation graphical user interface (GUI) 300. Alternative interfaces, with alternative layouts and/or providing alternative tools and functions, are possible.

GUI 300 includes a design preview area 302 on which a canvas 304 is shown. Canvas 304 is used to display a page (or, in some cases multiple pages) of a design that is being created. In this example an add page control 306 is provided (which, if activated by a user, causes a new page to be added to the design being created) and a zoom control 308 (which a user can interact with to zoom into/out of page currently displayed by canvas 304).

GUI 300 also includes an asset preview area 310. Preview area 310 displays previews 312 of design elements, templates, styles, colour palettes, or other assets that a user may wish to use when creating their design.

In the present example, preview area 310 is currently displaying colour palette previews 312. Each colour palette preview 312 includes one or more colours that have been defined for the colour palette that is represented by the preview. For example, the "Bold" colour palette preview 312 depicts six colours that have been defined for the "Bold" colour palette. The Bold colour palette may in fact include more six colours, however in this particular example previews 312 are limited to displaying a maximum of six colours.

As an alternative example, asset preview area 310 may display previews of design elements (e.g. a raster graphic, a vector graphic, a video, an audio track, or an alternative element) that a user can add to the design being created, e.g. by dragging and dropping a preview onto the canvas 304. Design elements may be added to a design in other ways.

In this example, the preview area 310 displays a scroll control 314 allowing a user to scroll through previews 312. A search control 316 is also provided, via which a user can submit search data (e.g. a string of characters) to search for particular assets. Previews 312 of the search results returned are then displayed in the asset preview area 310. In this example, a hide preview area control 318 is provided which can be activated to hide the preview area 310 (providing additional space in the design preview area 302).

The previews 312 displayed in preview area 310 (and the assets corresponding to those previews) may be accessed from various locations. For example, client application 132 may access previews (and corresponding assets) from one or more of: locally accessible data storage (e.g. non-transient memory such as 210 that is part of/connected to client system 130); data storage 118 of the server environment 110 (accessed via server application 114); third party server systems that server relevant content and are accessed via communications network 140 (e.g. via a general web search or other mechanism); and/or alternative locations.

GUI 300 also includes a type selection area 320 which displays a plurality of type selection controls 322. The type selection controls 322 may be activated by a user to select a type of asset for which previews 312 are displayed (and can be searched for) in preview area 310. By way of example, type selection controls 322 may be provided for types such as design templates, photos (e.g. raster graphics), vector graphics, text, audio, video, styles, colour palettes, and/or other types. In the example of FIG. 3, for example, a user may have selected a colour palette type control 322A causing the colour palette previews 312 to be displayed. A user may alternatively select a design element type control 322B in which case previews of design elements (e.g. shapes, graphics, audio, and/or other types of design elements) would be displayed in the asset preview area 310.

GUI 300 also includes an additional controls area 330 for displaying additional controls. The additional controls may include permanent controls (e.g. controls such as save, download, print, share, publish, and/or other controls that are frequently used/widely applicable and that application 132 is configured to permanently display); user configurable controls (which a user can select to add to or remove from area 330), and/or adaptive controls (which may automatically change depending on the type of design element that is currently selected/being interacted with by a user). For example, if a text element is selected, adaptive controls such as font style, type, size, position/justification, and/or other font related controls may be displayed. Alternatively, if a vector graphic element is selected, adaptive controls such as fill attributes, line attributes, transparency, and/or other vector graphic related controls may be displayed.

In the present example, GUI 300 includes recolour design control 332 which, when activated, triggers a design recolouring process as described below. Example GUI 300 also includes a calculate score control 334 which, when activated, triggers a design, design element, or design element group score calculation process as described below.

In the present example, GUI 300 includes a current colours representation 340 which represents colours used in the design 304 as currently displayed in the preview area 302. In this particular example, representation 340 displays a set of six colours that are used in design 304 (though additional/fewer colours may be displayed). In many cases the design 304 will make use of more colours than representation 304 is configured to display, in which case a subset of colours as used in the design are represented. In addition, a shuffle control 342 is displayed which can be interacted with to trigger a shuffle operation in which the design 304 is recoloured by shuffling its current colours (i.e. reusing the current colours of the design but changing which design elements are displayed in which colour, also discussed below). The current colours representation 340 (and shuffle control 342) may be selectively displayed/hidden by a user—e.g. by activation of a 'current colours' control or the like. Additionally, or alternatively, the current colours representation 340 (and shuffle control 342) may be automatically displayed and hidden. For example, they may be automatically displayed when a user activates a recolouring control such as 332 and then hidden when a user invokes an alternative function.

Once created, a user may output a design in various ways. For example, client application 132 may provide a user with options to output a design by one or more of: saving the design to local memory of client system 130 (e.g. non-transient memory 210); saving the design to data store 118 of server environment 110; printing the design to a printer (local or networked); communicating the design to another user (e.g. by email, instant message, or other electronic communication channel); publishing the design to a social media platform or other service (e.g. by sending the design to a third party server system with appropriate API commands to publish the design); and/or by other output means.

Data in respect of designs that have been (or are being) created may be stored in various formats. An example design data format that is used throughout this disclosure will now be described. Alternative design data formats (storing alternative design attributes) are, however, possible, and the processing described herein can be adapted for alternative formats.

In the present context, data in respect of a given design is stored in a design record. Generally speaking, a design record defines certain design-level attributes and includes page data. The page data includes (or references) one or more page records, each of which defines a page of the design. In turn, each page record may define one or more page-level attributes as well as element data for the page. The element data for a given page defines (or references) one or more element records which define design elements that have been added to the page In the present example, the format of each design record is a device independent format comprising a set of key-value pairs (e.g. a map or dictionary). To assist with understanding, an example partial of a design record format is as follows:

| Key/field | Note | E.g. |
|---|---|---|
| Design ID | A unique identifier of the Design. | "designId": "abc123", |
| Version | An identifier of a specific version of the design. | "version": "00001", |
| Creation date | The creation date of the document. | "creationDate": "1-jun-2020", |
| Creator ID | The identifier of a creator/owner of the design. (The ID will typically allow other user details to be retrieved, e.g. from a user database). | "userID": "UID00000001", |
| Dimensions | Dimensions (e.g. width and height) of the pages of the design. | "dimensions": {<br>  "width": 1080,<br>  "height": 1080<br>}, |
| Pages | An array of page records (described further below). | "pages": [<br>  {"elements": [{...}, {...},..., {...}]},<br>  {"elements": [{...}, {...},..., {...}]},<br>  ...,<br>  {"elements": [{...}, {...},..., {...}]}<br>], |

In this example, the design-level attributes include a design identifier, version, creation date, creator ID, and default page dimensions.

A design record's page data is a set (in this example an array) of page records, each of which defines page data in respect of a page of the design. A page record's position in a design's page array serves to identify the page and also determines its position in the design (e.g. a page at array index n appears after a page at array index n−1 and before a page at array index n+1).

In this example, each page record includes element data in the form of an element set (in this example an array). While not shown, a page record may also include additional page-level data, for example page dimensions (which, if present, override the design-level dimensions) and a page background attribute (which can define a background of the page—e.g. an image, a video, a fill colour/pattern, etc.).

Each element in a page's element array is either an element record (defining a single element that has been added to the page in question) or a set of element records (e.g. a further element array which defines a group of elements—i.e. two or more elements that have been added to the page and grouped together). For example, a page with an element array as follows indicates the page has four elements (defined by element records A, B, C, and D) and that the elements defined by element records C and D have been grouped together.

"elements": [{A}, {B}, [{C}, {D}]]

Generally speaking, an element is an object that has been added to a page—e.g. by copying (such as a drag and drop interaction in a design creation user interface such as GUI 300 above), importing from one or more element libraries (e.g. libraries of images, animations, videos, etc.), drawing/ creating using one or more design tools (e.g. a text tool, a line tool, a rectangle tool, an ellipse tool, a curve tool, a freehand tool, and/or other design tools), or otherwise being added to a design page.

The types of design elements available will depend on the system in question. By way of example, however, design element types such as the following may be provided: image elements (e.g. raster and/or vector graphic elements); video elements; audio elements; text elements; frame elements (e.g. vector graphic elements configured to receive other elements—such as graphics or videos); effects (e.g. an effect that applies to a page, such as a shower of confetti or other effect); and/or elements of other types.

The particular data (or attributes) associated with a design element that has been added to a page will depend on the type of element. For example, a video type element may include attributes such as start/end trim times and audio which may not be relevant to other element types. By way of example, however, an element record for an image type element may be as follows:

| Key/field | Note | E.g. |
| --- | --- | --- |
| Type | A value defining the type of the element (E.g. image, text, video, audio, other) | "type": "IMAGE", |
| Position | Data defining the position of the element on the page - e.g. a top-left (x, y) coordinate pair. | "position": (100, 100), |
| Size | Data defining the size of the element - e.g. a (height, width) pair. | "size": (500, 400), |
| Rotation | Data defining any rotation of the element. | "rotation": 0, |
| Opacity | Data defining any opacity of the element | "opacity": 1, |
| Media identifier | Data defining a link or pointer to a location where the original element data - e.g. the original raster or vector image data in this example - is located. | "mRef": "abc123", |

The storage location for design data (e.g. design records) will depend on implementation. For example, in the networked environment described above design records are (ultimately) stored in/retrieved from the server environment's data storage 118. This involves the client application 132 communicating design data to the server environment 110—for example to the server application 114 which stores the data in data storage 118. Alternatively, or in addition, design data may be locally stored on a client system 130 (e.g. in non-transient memory 240 thereof).

The present disclosure also refers to predefined colour palettes. For example, each colour palette preview 312 described above depicts a predefined colour palette. Generally speaking, a predefined colour palette defines a set of one or more colours. For example, a given predefined colour palette may be an array of RGB (or other colour space) colour values. Predefined colour palettes may, for example, be stored at and accessed from server environment 110.

In the present disclosure, processing is performed with respect to individual design pages. To this end, and unless stated otherwise, reference to a design herein is reference to a single page of a design. The techniques described herein may, however, be adapted to be applied to multi-page designs, for example by processing each page of a multi-page design separately.

Example Design

Figure 4:
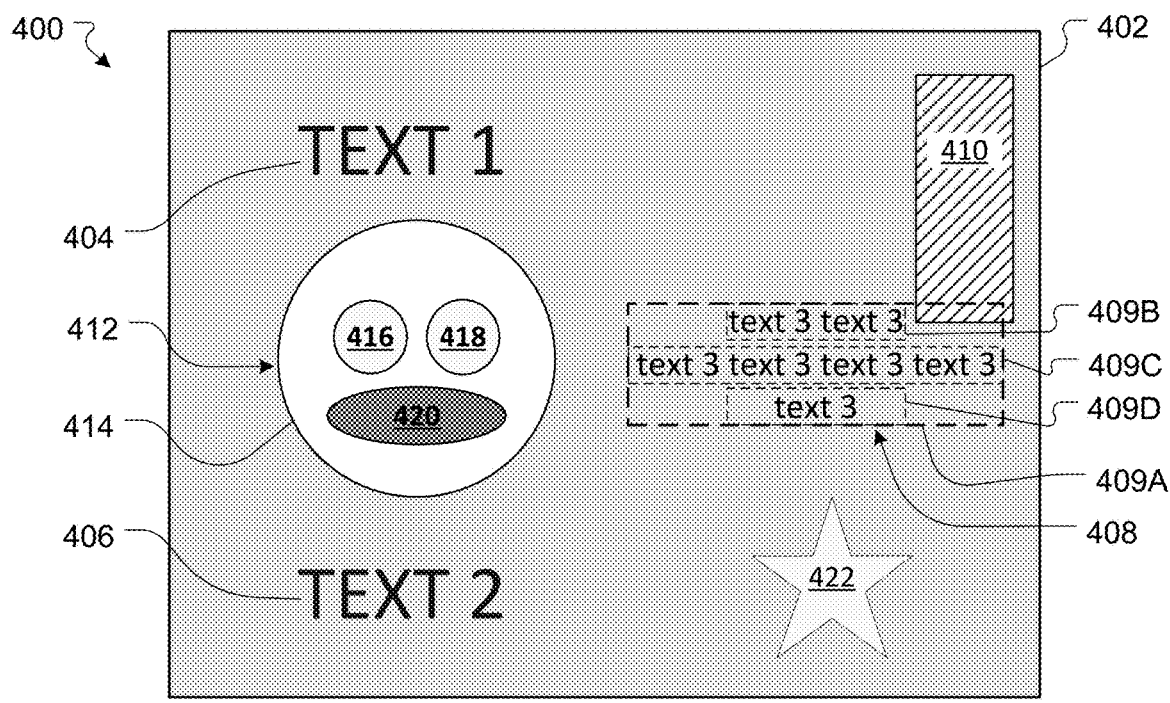
FIG. 4 depicts an example design.

To assist in understanding the present disclosure, FIG. 4 provides an example design 400. Example design 400 includes the following elements (in depth order, rearmost to foremost):

A background element 402 which, in this case, occupies the entire area of design 400 and is of a first colour (e.g. light grey, RGB(224,224,224)/#e0e0f4).

A first text element 404 with text in a second colour (e.g. blue, RGB(0,0,255)/#0000ff).

A second text element 406 with text in the second colour.

A third text element 408 with text in a third colour (e.g. black, RGB(0,0,0)/#000000). Text element 408 is depicted with its element bounding box 409A, as well as three inner bounding boxes 409B/C/D. These are described further below. Bounding boxes 409A/B/C/D are depicted in FIG. 4 for explanatory purposes, however are not visible in the final design.

A raster graphic element 410.

A vector graphic element 412 which, in this case, includes four components: an outer circle 414 in a fourth colour (e.g. white, RGB(255,255,255)/#ffffff); a first inner circle 416 in a fifth colour (e.g. yellow, RGB (255,255,0)/#ffff00); a second inner circle 418 in the fifth colour; and an inner ellipse 420 in a sixth colour (e.g. red, RGB (255,0,0)/ #ff0000).

A single-component vector graphic element 422 (a star shape) in the fifth colour.

Automatic Design Recolouring Method

Figure 5:
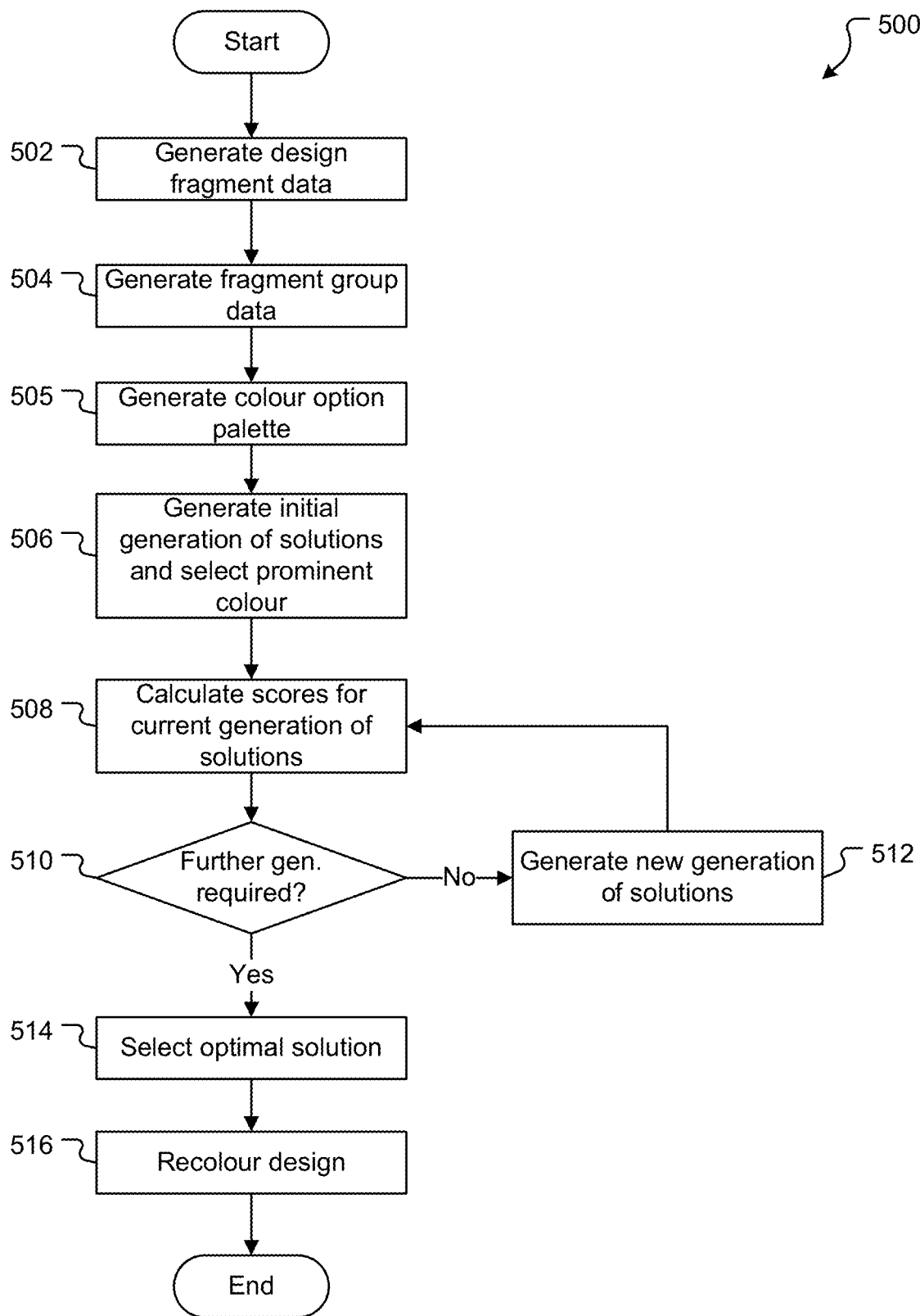
FIG. 5 depicts operations performed to automatically recolouring a design.

Turning to FIG. 5, a computer implemented method for automatically recolouring a design 500 will be described. As noted above, the operations of method 500 will be described as being performed by the client application 132 (shortened to application 132) running client system 130. In alternative embodiments, however, the processing described may be performed by (or in conjunction with) one or more alternative applications running on client system 130 and/or other computer processing systems.

Generally speaking, method 500 adopts a metaheuristic optimisation approach to recolouring a design. In particular, method 500 adopts a genetic algorithm approach. This involves generating a population of recolouring solutions, scoring those solutions using a fitness function, and selecting the optimal solution from the population based on the fitness function score. Various features of method 500 (for example the solution encoding approach or aspects thereof and/or the fitness function or aspects thereof) may, however, be used (or be adapted to be used) in alternative metaheuristic approaches.

The inputs to design recolouring method 500 include design data in respect of a particular design (i.e. the design that is being recoloured) and an input colour palette. As noted above, where a design includes multiple pages reference to a design in this context is reference to a single page of that design.

Method 500 may be triggered in various ways. For example, method 500 may be triggered by a user activating a user interface control provided by client application 132— e.g. recolour design control 332 of design creation user interface 300. In this case application 132 may generate a colour palette selection interface which displays one or predefined colour palette previews and from which a user can select an input colour palette. Alternatively, application 132 may automatically select a colour palette as the input colour palette. Automatic selection of a colour palette may be achieved in various ways, for example: selection based on a predefined colour palette that has previously been selected by the user; selection based on predefined colour palettes commonly/popularly selected by other users; random selection from predefined colour palettes available to the user; and/or alternative selection mechanisms.

As an alternative example, method 500 may be triggered by a user selecting a predefined colour palette. For example, a user may select a colour palette preview 312. In this case, the predefined colour palette associated with the selected preview 312 is the input colour palette.

At 502, application 132 generates design fragment data. The design fragment data identifies fragments of the design in question and is used to determine the solution encoding for the design and calculate the fitness function score for recolouring solutions that are generated.

Figure 6:
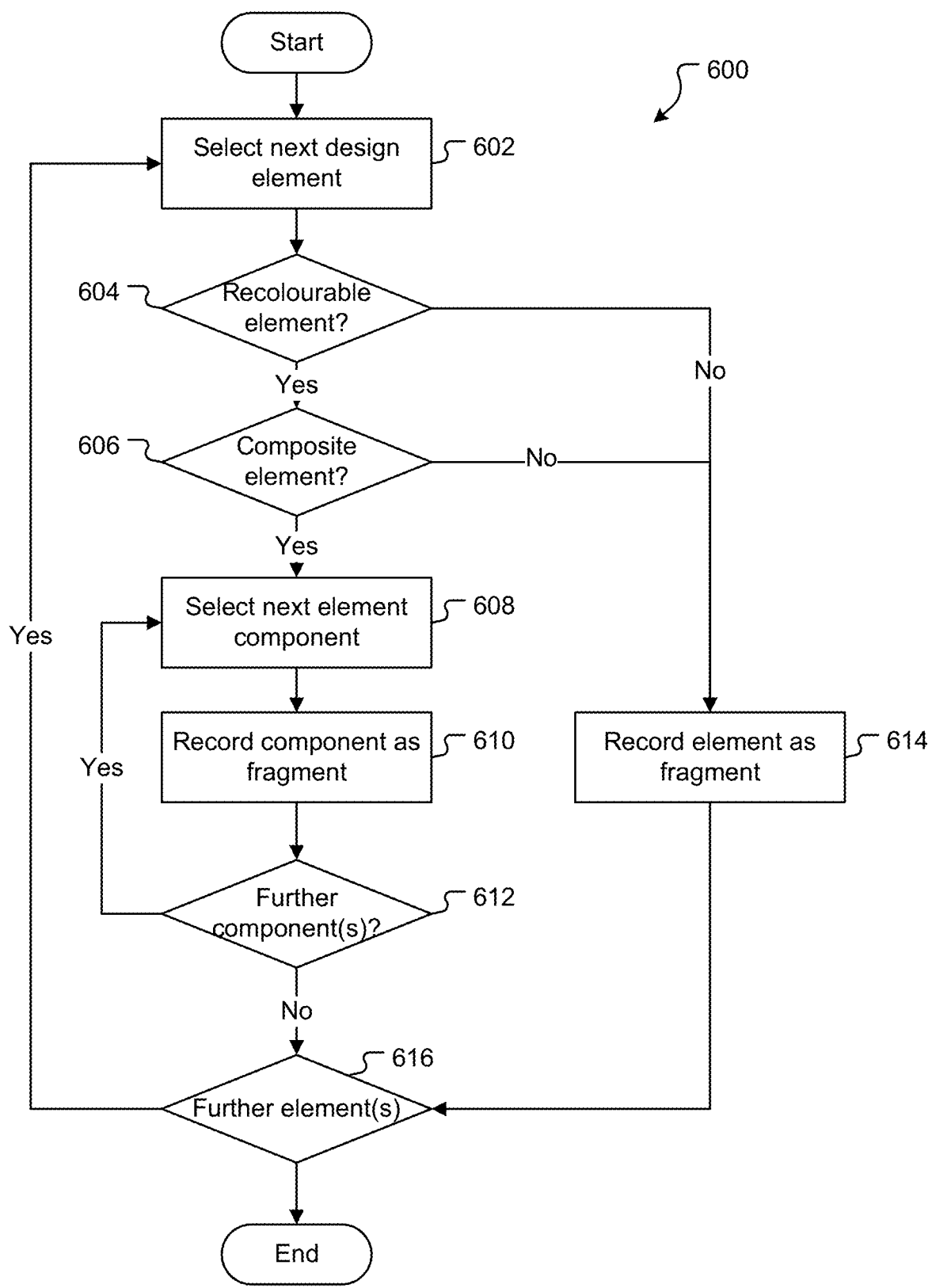
FIG. 6 depicts operations performed to generate fragment data for a design.

An example method for generating design fragment data is described with reference to FIG. 6 below. In the present embodiments, the design fragment data includes a set of fragment records, each of which defines a fragment of the design. In this particular example, each fragment record includes: a fragment ID (uniquely identifying the fragment); a design data ID (allowing the fragment in question to be identified in the original design data); a fragment colour (indicating the original colour of the fragment in the design data); a fragment type (indicating a type of the fragment, which is used for grouping purposes and is discussed further below); and bounding box data associated with the fragment. Fragment records may include additional and/or alternative fragment record fields.

For example, the fragment data generated for the example design of FIG. 4 may be as follows. The table below includes a 'corresponding FIG. 4 ref' column which is provided to assist with understanding and is not part of the fragment data.

| ID | Design data ID | Original colour | Fragment type | Bounding box data | (Corresponding FIG. 4 ref) |
|---|---|---|---|---|---|
| 0 | (0, Ø) | Grey | Background | | 402 |
| 1 | (1, Ø) | Blue | Text | | 404 |
| 2 | (2, Ø) | Blue | Text | | 406 |
| 3 | (3, Ø) | Black | Text | | 408 |
| 4 | (4, Ø) | Ø | xyz789 | | 410 |
| 5 | (5, 1) | White | abc123 | | 414 |
| 6 | (5, 2) | Yellow | abc123 | | 416 |
| 7 | (5, 3) | Yellow | abc123 | | 418 |
| 8 | (5, 4) | Red | abc123 | | 420 |
| 9 | (6, Ø) | Yellow | Other | | 422 |

In this example, and for ease of description, fragment identifiers (e.g. increasing integers) are indicated to be explicitly stored. In certain implementations, however, instead of explicitly storing a fragment ID fragments may be identified by the manner in which objects reference one another.

In this example, the design data ID for a given fragment is a tuple that includes an element identifier and a component identifier. In this case, and in the context of the design data as described above, the element identifier is the array index of the element in the design's element array (or, the relevant design page's element array). The component identifier in this example is a number indicating which particular component of the element in question the fragment relates to. In this example, a null (Ø) component identifier indicates that the fragment relates to a unitary element that does not have multiple components. Alternative values could be used to indicate a unitary element (or the component identifier simply omitted for unitary elements).

In this example, textual colour descriptions are used for readability, however application 132 will typically be configured to record colours more specifically—e.g. by a RGB hex value or alternative colour space value.

Fragment types are discussed further below. In this particular example, however, the fragment type value for a given fragment is one of: 'Background'; 'Text' (indicating a text-type fragment); a media identifier (e.g. 'abc124', which indicates that the fragment is a non-recolourable design element or component part of a complex vector graphic element and, at the same time, the media identifier of that fragment); or 'Other' (indicating that the fragment is not the background, not a text-type fragment, not a non-recolourable element, and not a component part of a complex vector graphic).

The bounding box data for a given fragment defines one or more bounding boxes associated with that fragment. Each bounding box may, for example, be defined by a top(y) coordinate, a left (x) coordinate, a width, a height, and a rotation.

While fragment data has been represented in a table format for ease of description it may be stored in any appropriate format (e.g. an array, a dictionary of key/value pairs, or any other appropriate format). Furthermore, the particular fragment data may vary from implementation to implementation and include fewer, additional and/or alternative data items to those described above. For example, while the fragment data described here includes the fragments original colour this need not be stored as fragment data and, instead, determined from the original design data as needed.

In some instances, design fragment data may already be available at 532 (having previously been generated and stored in memory). In this case, and provided the design in question has not changed, application 132 accesses the existing fragment data at 532 rather than regenerating it. If fragment data does exist it may be part of or associated with the design data. Alternatively, application 132 may check/ access fragment data from locally accessible storage or from server environment 110 (e.g. by querying the server application 114, which in turn queries data storage application 116).

At 504, application 132 processes the design in order to generate fragment group data. In this example fragment groups are determined by processing the fragment data generated at 502.

Figure 7:
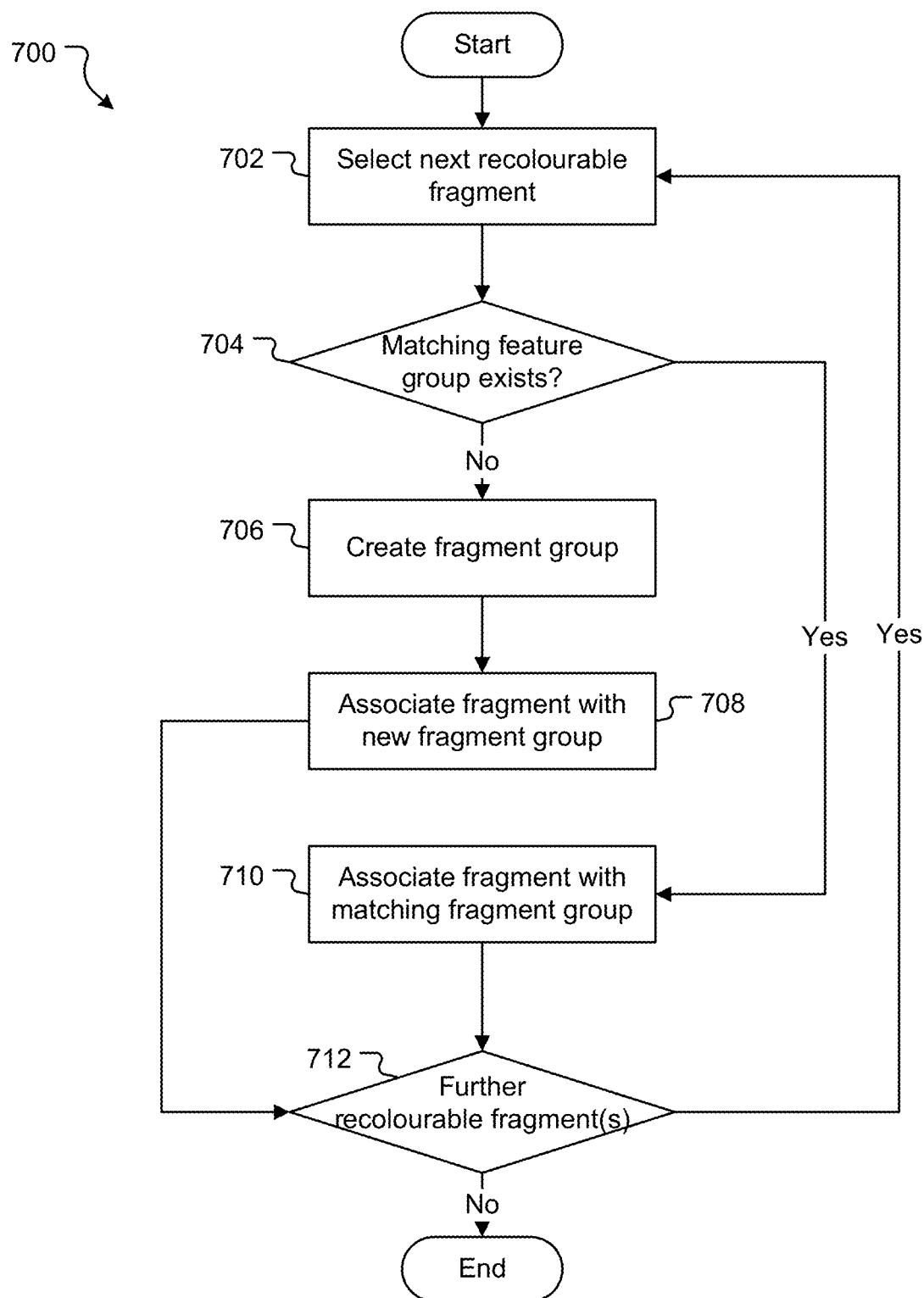
FIG. 7 depicts operations performed to generate fragment group data.

An example method for generating fragment group data is described with reference to FIG. 7 below. Generally speaking, however, this involves grouping the design's recolourable fragments based on grouping attributes. In the present embodiments, the fragment grouping data includes a set of group records, each of which defines a fragment group and includes: a group identifier (uniquely identifying the group); a set of fragment identifiers (identifying the one or more recolourable fragments that have been assigned to the group); a group colour (indicating the colour associated with the group); and a group type (indicating a type of the fragment group).

For example, the fragment group data generated for the example design of FIG. 4 may be as follows:

| Group ID | Fragments | Group colour | Group type |
|---|---|---|---|
| 0 | [0] | Grey | Background |
| 1 | [1, 2] | Blue | Text |
| 2 | [3] | Black | Text |
| 3 | [5] | White | abc123 |
| 4 | [6, 7] | Yellow | abc123 |
| 5 | [8] | Red | abc123 |
| 6 | [9] | Yellow | Other |

Once again, explicit group identifiers have been provided in the example for readability. In certain implementations, however, groups may instead be implicitly defined (e.g. due to a group record's position in an ordered set or an alternative mechanism).

The list of fragment groups (and, specifically, which fragment(s) is/are in which group) is the solution encoding for the design in question. Adopting genetic algorithm terminology, each fragment group determined at 504 may be referred to as a gene.

Figure 8:
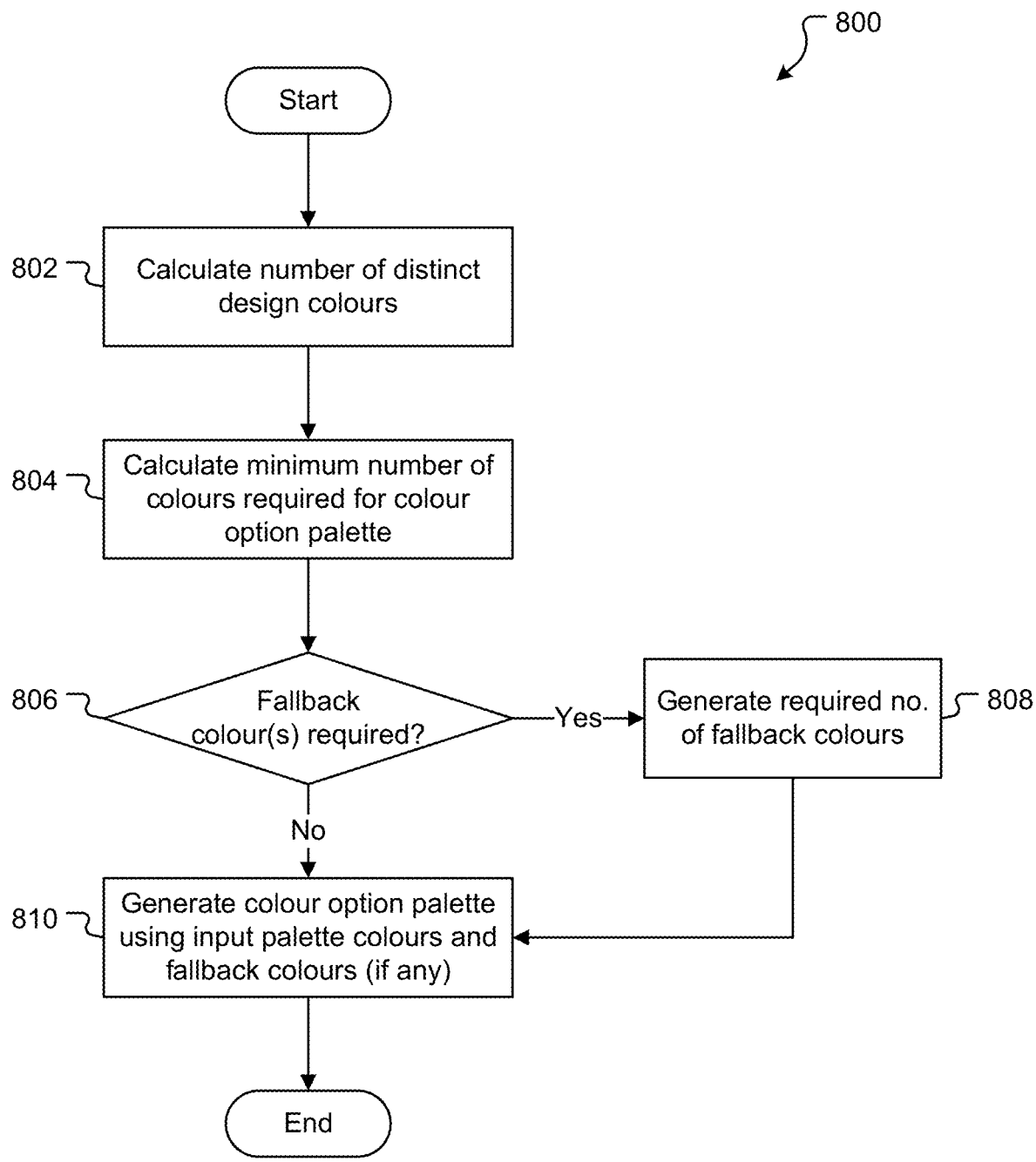
FIG. 8 depicts operations performed to generate a colour option palette for a design.

At 505, application 132 generates a colour options palette which defines colours that are to be used in recolouring a design. The colour options palette includes the colours defined by the input colour palette, but may include additional colours that application 132 automatically selects if the input colour palette is determined not to define a sufficient number of distinct colours. An example process for generating the colour options palette is described with reference to FIG. 8 below.

Over operations 506, 508, 510, and 512 application 132 generates potential recolouring solutions and scores those solutions according to a fitness function (described below). In this particular example a genetic approach to generating solutions is adopted, however, alternative approaches could be used.

At 506, application 132 generates an initial generation of solutions. In the present embodiments, each solution is an array with each element defining a colour and representing a particular recolourable fragment group (as defined by the solution encoding).

To illustrate this, a solution representing the design of FIG. 4 may take a format as follows:

["#e0e0f4", "#0000ff", "#000000", "#ffffff", "#ffff00", "#ff0000", "#ffff00"]

In this example format, the first element of the example solution (index 0) corresponds to the fragment group with the same identifier (group ID 0) and, as such, represents fragment ID 0. Similarly, the second element of the example solution (index 1) corresponds to the fragment 1 and represents fragments 1 and 2. In this example, and for the purposes of illustration, the solution colours represent the original colours of the design—in practice, however, the solution colours would in all likelihood be different).

Adopting genetic algorithm terminology, each solution may be referred to as a genotype.

Application 132 determines the colours for the initial solutions by reference to the colour option palette generated at 505.

In certain embodiments, in order to generate the initial generation of solutions application 132 is configured to randomly select a colour from the colour option palette for each element (gene) of each solution's solution array. In alternative embodiments, application 132 selects colours for the initial generation of solutions based on the colour option palette in alternative ways (e.g. by sequentially assigning colours from the colour option palette to solution array elements in order, looping through the colour palette colours if the solution array includes more elements (genes) than the number of colours in the colour option palette).

As described below, in certain embodiments the fitness function used to score solutions includes an expression that rewards use of a prominent colour for the design's prominent fragment. In these embodiments, application selects one of the colours from the colour option palette to be the prominent colour for a given set of solutions that are generated over the course of 506-512. By way of example, application 132 may be configured to select the first colour in the colour option palette as the prominent colour for a generation of solutions.

Application 132 may be configured to generate any appropriate number of solutions (i.e. the population size) for in the initial generation (and/or each following generation). By way of example, in certain implementations a population size of 16 solutions per generation may be appropriate.

At 508, application 132 calculates a solution score for each solution in the current generation. In the first iteration the current generation is the initial generation as generated at 506. Subsequent iterations will score subsequent solution generations (as generated at 512). An example method for calculating solution scores (and the fitness function used to do so) is described below with reference to FIG. 9, however it will be appreciated that alternative fitness functions and calculation methods are possible.

At 510, application 132 determines whether a further generation of solutions is required. If so, processing proceeds to 512. If not, processing proceeds to 514. Determining whether a further generation is required may be performed in various ways. For example, application 132 may be configured to determine that no further solution generations are required based on termination criteria. Termination criteria, in turn, may be based on one or more conditions such as: a predefined total number of generations having been generated/scored; the occurrence of a defined number (2 or more) of generations for which no improvement in the solution scores; the occurrence of a generation that includes one or solutions having a solution score that satisfies a defined target score condition (e.g. solution score <=a defined target score).

In one particular embodiment, application 132 is configured to determine that no further solution generations are required if either: a total number of generations (e.g. 100 generations, or any other predefined total) has been generated; or a predefined timeout period has elapsed.

At 512, application 132 generates a new generation of solutions. Following this, processing proceeds to 508 (to score the new generation of solutions).

Application 132 may be configured to generate solutions for the new generation in various ways. For example, a solution for a new generation may be generated by: copying (selecting) a solution from the previous generation (e.g. based on the solution's score); generating a new solution by mutating a previous generation solution; generating a new solution by breeding one more new generation solutions.

In one particular embodiment, application 132 is configured to generate the new generation of solutions by a combination of: selection (e.g. by tournament selection involving selecting two candidate solutions at random then selecting the fitter of the two candidate solutions); breeding (e.g. by crossover breeding involving randomly selecting a tract of genes then swapping that tract of genes between two parents to create children); and mutation (e.g. by a random replacement mechanism involving iterating across the genome and for each gene probabilistically determining whether or not that gene should be mutated).

Where a new generation solution is generated by mutation of a current-generation solution, application 132 is configured to select a new colour (or colours) for each solution array element (gene) being mutated from the colour option palette. In the present embodiment, for a given solution array element that is being mutated, application 132 randomly selects a colour from the colour option palette generated for the design.

At 514, application 132 determines an optimal solution from the solutions generated over the course of 506, 508, 510, and 512. Application 132 selects the optimal solution based on the solution's score as calculated at 508—i.e. the solution with the most optimal score.

At 516, application 132 recolours the design based on the solution selected at 514. As discussed above, the selected solution will (in the present example) be an array in which each element defines a colour and corresponds to a particular fragment group. For each element of the solution array, application 132 determines the relevant fragments (e.g. by reference to the fragment group data) and recolours those fragments using the colour defined by the array element. The recoloured design is then displayed, e.g. in the design creation UI 300.

The recoloured design may be displayed with one or more UI controls that allow a user to accept the design as recoloured (e.g. an accept control) or reject the recolouring (e.g. a reject control). Where a recoloured design is rejected, application 132 may revert the design to its original colours. In addition, or alternatively, application 132 may display a 'recolour again' control. Where application 132 detects activation of the recolour again control it may be configured to select a new prominent colour from the input colour palette, re-perform the solution generation operations (e.g. at 506-512), select a new optimal solution at 514, and recolour the design with the new optimal solution at 516.

As noted above, method 500 as described adopts one particular approach to finding an 'optimal' (within the context of the solutions that are generated) recolouring solution. Alternative approaches are, however, possible. For example, application 132 may be configured to adopt an alternative metaheuristic optimisation algorithm such as a hill-climbing algorithm, a simulated annealing algorithm, a differential evolution algorithm, and/or an alternative metaheuristic optimisation algorithm.

Generating Design Fragment Data

At 502, and if fragment data for the design in question does not already exist, application 132 processes the design in question to generate fragment data. An example method 600 for doing so will be described with reference to FIG. 6.

At 602, application 132 selects the next unprocessed design element from the design being processed. Design elements may be processed in any order. By way of example, and in the context of the design record data described above, design elements may be processed in depth order (rearmost-to-foremost) by iterating through the design's element array from start (index 0) to end.

In the present embodiments, application 132 is configured to ignore certain element types when generating the fragment data. In this example, application 132 ignores any elements that do not have a visual appearance in the final design (e.g. audio elements). Other element types may also be ignored—for example video elements. When such elements are encountered in the course of process 600 (e.g. at 602), application 132 discards or skips those elements and selects the next element for consideration.

Furthermore, some elements may require additional processing before being considered. For example, for multi-frame elements (such as animations) a single frame of the image may be selected and treated as a raster image when generating fragment data.

At 604, application 132 determines if the currently selected design element is a recolourable element. If so, processing proceeds to 606. If not, processing proceeds to 614.

Application 132 determines whether a design element is recolourable or not based on defined recolourable element criteria. The recolourable element criteria may vary depending on implementation, however in the present embodiments application 132 is configured to determine that elements meeting the following criteria are recolourable: text-type elements; and vector graphic-type elements which use less than a defined number of colours (referred to as the vector colour threshold). Conversely, in the context of these criteria the following elements would be determined not to be recolourable elements: raster elements; vector graphic elements with >=colours than the vector colour threshold.

In this example, the vector colour threshold is applied to avoid recolouring vector elements with large numbers of colours. A range of values may be appropriate for the vector colour threshold. By way of example, application may be configured with a vector colour threshold of five colours.

Alternative recolourable element criteria may be defined and implemented.

At 606, application 132 determines if selected design element is a composite element. If so, processing proceed to 608. If not, processing proceeds to 616.

In the present context, a composite element is an element which is composed of two or more recolourable components. A recolourable component is, in turn, a component of an element that application 132 has been configured to be able to recolour separately to other components of that same element.

By way of example, a single vector graphic element may define several components (e.g. rectangles, circles, paths and the like) which are separately recolourable (e.g. via their stroke and/or fill attributes). Such vector graphic components may be recolourable components. Accordingly, application 132 would determine a vector graphic that includes more than one such component to be a composite element.

As a further example, a single text element may define text with varying attributes—e.g. different fonts, different font colours, different font sizes and the like. Where a single text element defines characters with different values for the same attribute, application 132 may be configured to determine that the text element is a composite element. Determination of specific recolourable components of a text element may be done on various bases. As one example, example application 132 may be configured to determine recolourable components of a text element based on colour (e.g. so characters of one colour are determined to be a different recolourable component to characters of another colour). Alternatively, application 132 may be configured to determine recolourable components of a text element based on a combination of attributes (e.g. one or a combination of colour, font type, font size, and/or other relevant text attributes).

At 608, the element is a composite element. In this case application 132 selects the next (unprocessed) recolourable component of composite element. Recolourable components of the composite element may be processed in any order— for example by sequentially reading the element's data and processing the recolourable components in order.

At 610, application 132 generates a fragment record for the selected recolourable component and writes the fragment record to the fragment data. Processing then proceeds to 612.

In the present example, and as described above with reference to 502, a fragment record includes: a fragment record identifier (e.g. an integer); a design data identifier (e.g. an (element identifier, component identifier) tuple); the fragment's original colour (as defined in the design data); the fragment type; and fragment bounding box data.

Determining a fragment's type is described below with reference to operation 614.

The fragment's bounding box data is calculated based on the element data of the element that the component in question is part of (e.g., in the context of the design data as described above, the element's position and size attributes). Various approaches to calculating (and storing) the bounding box data for a fragment are possible. For example, where the fragment is a component part of a vector graphic, the bounding box of the entire vector graphic element may be used as the fragment's bounding box. Alternatively, application 132 may be configured to instead (or additionally) calculate what will be referred to as an inner bounding box which reflects the bounds of the component itself rather than the bounds of the entire element that the component forms part of.

As another example, where a fragment is a text element, application 132 may be configured to calculate inner bounding boxes for components of that text element—e.g. a bounding box for each paragraph (or for each line) of text.

Calculating inner bounding boxes in this way may provide certain advantages, for example when determining whether fragments truly overlap (which is useful in calculating contrast scores for the fitness function as discussed below). This can be seen with reference to elements 408 and 418 shown in FIG. 4. In FIG. 4, the overall bounding box 409A of text element 408 is depicted. Inner bounding boxes 409 B/C/D of text element 408 are also depicted (in the example inner bounding boxes being calculated for each line of text element 408). As can be seen, if only the outer bounding box 409A of element 408 was taken into account, element 408 would be determined to overall element 410. With inner bounding boxes 409 B/C/D taken into account, however, element 408 would not be determined to overlap element 410.

At 612, application 132 determines whether selected composite element has any further (unprocessed) recolourable components. If so, processing proceeds to 608. If not, processing proceeds to 616.

At 614, the element is either a non-recolourable element (as determined at 604) or a recolourable unitary element (i.e. not a composite element, as determined at 606). In this case, application 132 generates a fragment record for the selected element and writes the fragment record to the fragment data. This is similar to 610 describe above. Processing then proceeds to 616.

At both 610 and 614 application 132 generates fragment records, and each fragment record defines a fragment type. In the present embodiment, application 132 determines the fragment be one of the following fragment types and records a type value accordingly.

If the fragment is the background element, the fragment is a background-type fragment (recorded by a value such as 'Background', 'B', '1', or any other appropriate value).

If the fragment is a text element (or recolourable component of a text element), the fragment is a text-type fragment (recorded by a value such as 'Text', 'T', '2', or any other appropriate value).

If the fragment is a component part of a complex vector graphic element, the fragment is a complex vector graphic-type fragment. In this case, application 132 records the media identifier of the element the component part belongs to as the type value. As discussed below, this is then used when grouping fragments. Application 132 determines a vector graphic element to be a complex vector graphic if it defines more than a defined number (referred to as the complexity threshold) of recolourable components. By way of example, the complexity threshold may be 2.

If the fragment is a non-recolourable element, application 132 records the media identifier of the element as the type value.

If the fragment is none of the above it is an other type fragment (recorded by a value such as 'Other', 'O', '3', or any other appropriate value).

In the present embodiments, fragment types are used in determining fragment groups. In alternative implementations, application 132 may be configured to determine additional and/or alternative fragment types (based on additional and/or alternative design element or design element component attributes) to those described above.

At 616, application 132 determines if the design includes any further (unprocessed) elements. If so, processing returns to 602. If not, determining fragment data for the design is complete.

In certain implementations, application 132 may be configured to save the design's fragment data so this data can be reused in future operations if necessary. In this case the fragment data will be associated with the design data and (typically) stored in the same place as the design data. This may, for example, be as a design-level attribute of the design (stored in/with the design data). In addition, the fragment data may be associated with version information for the design to enable application 132 to determine whether the data is current, or whether the design has changed since the fragment data was generated. Any appropriate version information may be used, for example a version number, a hash of the design data on which the fragment data was generated, or alternative version information.

Determining Fragment Groups

At 504 above, application 132 generates fragment group data. As noted above, this may be referred to as determining the solution encoding or genetic representation of the design. A method 700 for processing the fragment data generated 502 to generate fragment group data will be described with reference to FIG. 7.

Over the course of method 700, only recolourable fragments are processed and added to fragment groups. In the context of the design fragment data as generated above, therefore, any design fragments that are non-recolourable (e.g. fragments that correspond to raster images or to vector graphics elements that define too many colours) are ignored when generating fragment group data.

At 702, application 132 selects the next unprocessed recolourable design fragment from the fragment data. Recolourable fragments may be processed in any order—e.g. in order of fragment identifier.

At 704, application 132 determines if a matching fragment group exists for the selected fragment. If not processing proceeds to 706. If so, processing proceeds to 710. Application 132 determines whether a matching fragment group exists based on grouping parameters which, in this case, are the selected fragment's type and colour (which, in this instance, form part of the fragment's record in the fragment data). Specifically, a matching fragment group is a fragment group that is associated with a colour and type that match those of the current fragment. In the present embodiment a matching colour is one that has the same colour value (e.g. RGB hex or alternative colour space value).

At 706, no matching fragment group exists. In this case application 132 creates a new fragment group record. In the present example, and as described above with reference to 504, a fragment group record includes: a fragment group identifier (e.g. an integer); a set of fragments (e.g. an array of fragment identifiers); a colour; and a type.

Accordingly, in order to create a new group record at 706 application 132 determines a new group identifier. In this example, fragment group identifiers are integers which are generated by starting at 0 (for the first fragment group created at 706) and incrementing (by 1) for each new fragment group that is generated. This allows each fragment group to map directly to an element of the solution array: i.e. the first element of the solution array (index 0) corresponds to fragment group ID 0, the second element of the solution array (index 1) to fragment group ID 1 and so forth. Application 132 also: associates the current fragment with the group (by appending its fragment ID to the array of fragment identifiers); sets the group colour to the colour of the fragment; and sets the group type to the type of the fragment. Processing then proceeds to 712.

At 710, a matching fragment group does exist. In this case application 132 associates the current fragment with that matching fragment group—e.g. by appending the fragment's identifier to the group's fragment array. Processing then proceeds to 712.

At 712, application 132 determines if the fragment data defines any further (unprocessed) recolourable fragments. If so processing proceeds to 702 to select the next unprocessed fragment. If not, the determination of fragment groups is complete.

As with the fragment data above, application 132 may be configured to save the design's fragment group data so this data can be reused in future operations if necessary. As with the fragment data, the fragment group data will typically be associated/stored with the design data (and fragment data, if stored), and may be associated with design version information.

Colour Option Palette

As described above, at 505 of method 500 application 132 generates a colour options palette. The colour options palette is used when generating initial generation solutions at 506 and when generating new-generation solutions by mutation at 512). A method 800 for generating a colour option palette for a design will be described with reference to FIG. 8. A colour option palette may, however, be generated in alternative ways.

In the present embodiments, and generally speaking, the colour option palette is based on and includes all colours defined by the input colour palette. Application 132 may, however, select additional colours for the colour option palette (referred to as fallback colours) if the number of colours defined by the input colour palette is determined to be insufficient.

At 802, application 132 calculates the number of distinct design colours.

In this context, design colours are colours that are defined by recolourable elements of the design in question (for example text colours and fill colours defined by vector graphic elements). It is again noted that in the present context, if a design includes multiple pages reference to a design is reference to a single design page.

In the context of generating a colour option palette, application 132 may determine that two or more colours are not distinct in various ways. For example, application 132 may be configured to use the calculate the DeltaE2000 colour distance between colours and determine two colours are not distinct where their DeltaE2000 distance is less than a defined minimum (e.g. 5).

At 804, application 132 calculates the minimum number of colours required for the colour option palette.

In the present examples, application 132 determines the minimum number of colours with reference to the following values: an absolute minimum; a design-relative minimum (calculated as the number of distinct colours in the design (calculated at 802) plus a defined extra colours number); and a sufficient minimum.

Specifically: if the number of distinct design colours is greater than or equal to the defined sufficient minimum, the minimum number of colours required for the colour option palette is the sufficient minimum. If not, the minimum number of colours required for the colour option palette is the greater of the absolute minimum and the design relative minimum.

By way of example, the defined absolute minimum may be three, the defined extra colours number may be two, and the defined sufficient minimum may be twelve. Alternative values (and/or alternative criteria for determining the minimum number of colour option palette colours) may be used.

At 806, application 132 determines if one or more fallback colours are required. If so, processing proceeds to 808. If not processing proceeds to 810.

In the present example, application 132 will determine that one or more fallback colours are required if the number of distinct design colours (calculated at 802) is less than the minimum number of colours required for the colour option palette (calculated at 804).

At 808, application 132 generates one or more fallback colours. The number of fallback colours generated by application 132 is equal to the minimum number of colours required for the colour option palette (calculated at 804) minus the number of distinct design colours (calculated at 802). Following generation of fallback colours processing proceeds to 810.

Fallback colours may be generated at 808 in various ways. For example, application 132 may be configured to generate one or more fallback colours based on one or more of the colours defined by the input colour palette—for example by generating luminance (or brightness) variants of those colours.

As a further example, if the design defines a small number of distinct colours (e.g. one or two colours), application 132 may be configured to select white and/or black as fallback colours.

At 810, application 132 generates the colour option palette. The colour option palette will include the input colour palette colours and fallback colours generated at 808 (if any). The colour option palette may, for example, be stored as an array of colour values.

Solution Scoring

At 508 above, application 132 calculates solution scores.

Solution scores are calculated using a fitness function. In the present example, the fitness function is designed to take into account a number of characteristics of a design (the design as recoloured by a given solution). These characteristics, and how measures thereof are calculated, are discussed below. In the present example, the characteristics that are taken into account when scoring a recolouring solution include: the contrast of the recoloured design; the legibility of the recoloured design; a change in complex vector graphic luminance between the original design and the recoloured design; the usage of fallback colours in the recoloured design; the colour of the design's prominent fragment in the recoloured design.

Figure 9:
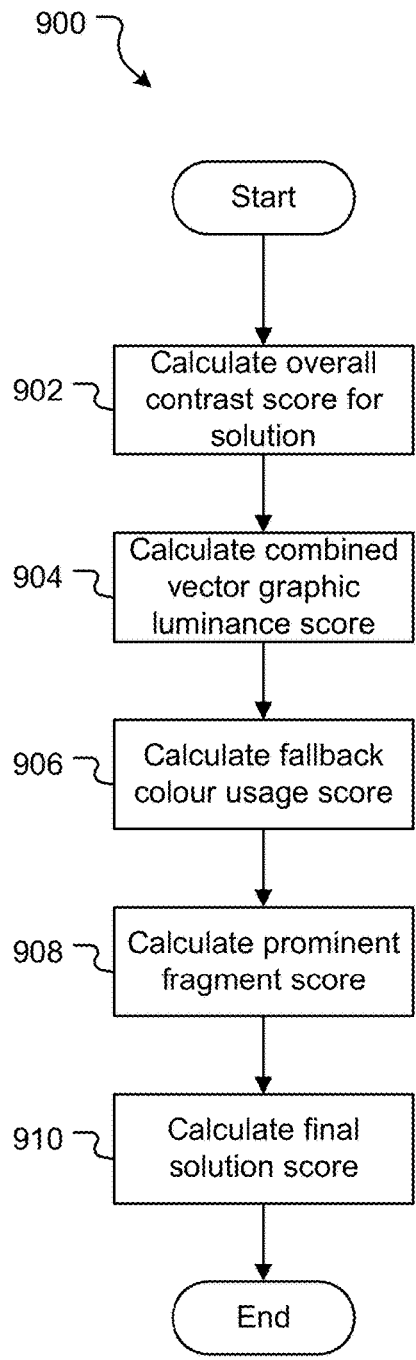
FIG. 9 depicts operations performed to calculate a solution score.

An example solution score calculation method 900 will be described with reference to FIG. 9. Initially, an overview of the fitness function is provided, followed by a more detailed description.

Figure 10:
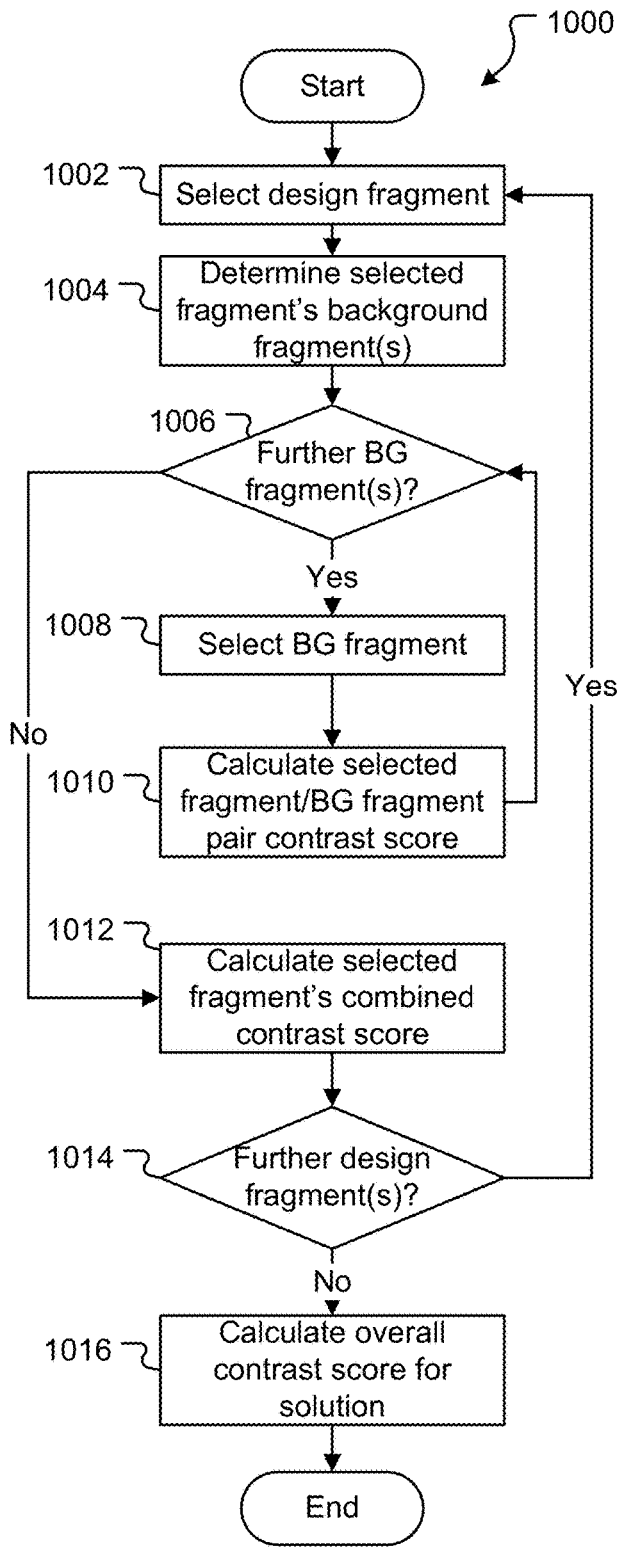
FIG. 10 depicts operations performed to calculate a solution's overall contrast score.

At 902, application 132 calculates an overall contrast score for the solution in question. An example process 1000 for calculating a solution's overall contrast score is described below with reference to FIG. 10.

At 904, application 132 calculates a combined vector graphic luminance score. This is described further below.

At 906, application 132 calculates a fallback colour usage score. This is described further below.

At 908, application 132 calculates a prominent fragment score. This is described further below.

At 910, application 132 calculate the final solution score based on the above scores. In the present example, application 132 calculates the final score for a solution as follows:

Solution score=overall contrast score (calculated at 902)+combined vector graphic luminance score (calculated at 904)+fallback colour usage score (calculated at 906)+prominent fragment score (calculated at 908).

It will be appreciated that while a specific fitness function example is described herein alternative fitness functions are possible. Alternative fitness functions may take into a subset of the various scores described above, and/or may take into account different scores/considerations to those described above. Alternative fitness functions may combine scores in different ways (e.g. using different weightings and operators). Alternative fitness functions may calculate similar scores to those described above but do so in alternative ways (e.g. using alternative contrast score calculations, alternative legibility score calculations, alternative vector graphic luminance score calculations, alternative fallback colour usage score calculations, and/or alternative prominent fragment score calculations). Furthermore, while the various scores that contribute to the final score have been described as being calculated in a particular order the scores can, generally, be calculated in any appropriate order (the exception in this particular example being that the fragment contrast scores will be calculated before the text-considered contrast score given the text considered contrast score is based on the fragment contrast scores).

Example Overall Contrast Score Calculation

At 902 above, application 132 calculates an overall contrast score for a solution. An example overall contrast calculation process 1000 will be described with reference to FIG. 10.

In example process 1000, and generally speaking, application 132 is configured to calculate a contrast score for each fragment in the design (this is referred to as the fragment's combined contrasts score). In the present example, this involves application 132 selecting each fragment in turn (at 1002), calculating the selected fragment's combined contrast score (at 1012), then determining whether further fragments still need to be processed (at 1014). In this processing loop, design fragments may be selected for processing in any order. In alternative implementations, application 132 may be configured to calculate combined fragment contrast scores for multiple fragments in parallel.

At 1002, application 132 selects an unprocessed design fragment. The fragment selected at 1002 may be referred to as the foreground fragment for the purposes of calculating its combined fragment contrast score.

At 1004, application 132 determines the selected fragment's background fragments.

In the present context, a selected (or foreground) fragment's background fragments are all design fragments that: are a different colour to the foreground fragment; are behind the foreground fragment; and that the foreground fragment visually touches.

Determining whether a first fragment is behind a second fragment is determined based on depth data (or fragment ordering).

Determining whether a first fragment visually touches a second fragment is based on the bounding box data of the first and second fragments and the opacity/transparency data of those fragments.

Figure 11:
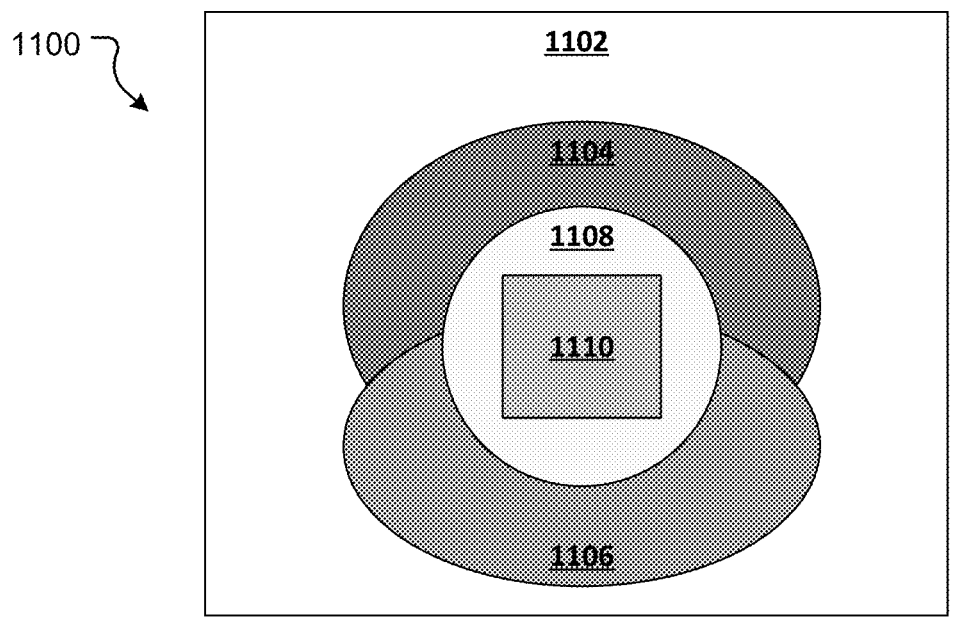
FIG. 11 depicts an example design.
Figure 12:
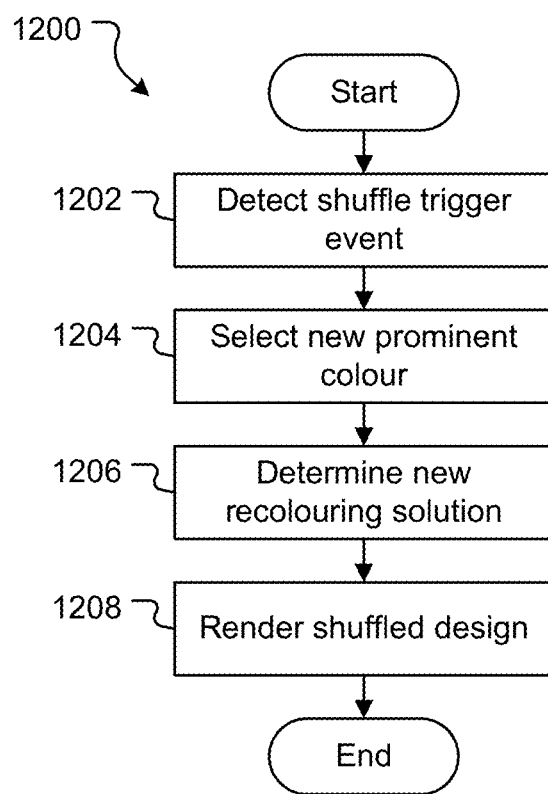
FIG. 12 depicts operations performed to shuffle a design's colours.

To illustrate background fragments, consider example design 1100 of FIG. 11. Example design 1100 includes: a solid white fragment 1102 (the background, depth 0); a solid red fragment 1104 (depth 1); a solid blue fragment 1106 (depth 2); a solid yellow fragment 1108 (depth 3); and a solid green fragment 1110 (depth 4). In this example, none of fragments 1102 to 1110 are transparent.

In this example, therefore: fragment 1110's background fragments include fragment 1108 only (as fragment 1110 is completely enclosed by fragment 1108 and fragment 1108 is not transparent); fragment 1108's background fragments include fragments 1106 and 1104 (as fragments 1106 and 1104 are both behind fragment 1108 and fragment 1108 visually touches both of these fragments); fragment 1106's background fragments include fragments 1104 and 1102; fragment 1104's background fragments include fragment 1102; and fragment 1102 (which is the background) does not have any background fragments.

By way of further example, if fragment 1108 was transparent, fragment 1110 would visually touch fragments 1106 and 1104 due to this transparency. In this case, fragment 1110's background fragments would include fragment 1108, 1106, and 1104 (as fragments 1104 and 1110 is completely enclosed by fragment 1108 and fragment 1108 is not transparent).

By way of still further example, if fragments 1108 and 1106 were the same colour, fragment 1108's background fragments would include fragment 1104 only (in this case fragment 1106 being disregarded due to being the same colour as fragment 1108).

Following determination of the selected fragment's background fragments, application 132 calculates a fragment pair contrast score for each (selected fragment, background fragment) pair. In the present example this involves application 132 processing each (selected fragment, background fragment) pair in turn over processing loop 1006 to 1012. In this processing loop background fragments may be selected for processing (at 1008) in any order. In alternative implementations, application 132 may be configured to calculate background fragment contrast scores for multiple background fragments in parallel.

At 1006, application 132 determines whether one or more (selected fragment, background fragment) pair scores still need to be calculated. If so, processing proceeds to 1008. If not, processing proceeds to 1012.

At 1008, application 132 selects an unprocessed background fragment. The selected fragment's background fragments may be selected and processed in any order (or in parallel).

At 1010, application 132 calculates a fragment pair contrast score for the selected foreground fragment (i.e. the fragment selected at 1002) and the selected background fragment (i.e. the fragment selected at 1008).

In the present embodiments, application 132 calculates fragment pair contrast scores differently depending on whether the selected (or foreground) fragment is a non-text fragment or a text fragment. Example approaches for each scenario are described below.

Following calculation of the fragment pair contrast score processing returns to 1006 (to determine whether any of the selected/foreground fragment's background fragments have not yet been processed.

At 1012, fragment pair scores have been calculated for all of the (selected fragment, background fragment) pairs. At 1012, application 132 calculates a combined contrast score for the selected fragment. The selected fragment's combined contrast score is based on the set of (selected fragment, background fragment) pair contrast scores (as calculated for each pair at 1010).

In the present embodiments, application 132 calculates a selected fragment's combined contrast score by calculating the average of the selected fragment's average fragment pair contrast score (averageFragmentPairContrast) and the selected fragment's worst individual fragment pair contrast score (worstFragmentPairContrast). E.g.:

Fragment's combined contrast score=(averageFragmentPairContrast+worstFragmentPairContrast)/2

To illustrate this, to calculate the initial fragment contrast score for fragment 1108 of design 1100, application 132 would calculate: a first fragment pair contrast score for fragment pair 1108 and 1104; a second fragment pair contrast score for fragment pair 1108 and 1106; calculate the average fragment pair contrast as (first fragment pair contrast+second fragment pair contrast)/2; and calculate the initial fragment contrast for fragment 1108 as (averageFragmentPairContrast+worstFragmentPairContrast)/2.

In this example, a fragment's combined contrast score is pessimistic in the sense that extra weight is given to the worst individual fragment pair contrast score. This is with the rationale that in many cases a single conspicuous contrast issue can compromise an entire design.

At 1014, application 132 determines whether combined fragment contrast scores for one or more further design fragments need to be calculated. If so, processing proceeds returns to 1002 (to select a further design fragment and calculate it's combined contrast score). If not, processing proceeds to 1016.

At 1016, combined fragment contrast scores have been calculated for all fragments of the design. In this case, application 132 calculates an overall contrast score for the solution. The overall contrast score for the solution is based on the set of combined fragment contrast scores (calculated at 1016) for the design.

In the present embodiments, application 132 is configured to weight the combined fragment contrast scores of text type fragments more heavily that the combined fragment contrast scores of non-text type fragments when calculating the overall contrast score for a solution. By way of specific example, application 132 may be configured to calculate the overall contrast score for a solution as:

Solution's overall contrast score=$x$*average combined fragment contrast scores of text fragments+$y$*average combined fragment contrast scores of non-text fragments.

Various values for weights x and y may be used. For example, x=3 and y=1 may be suitable weights. Application 132 may be configured to use alternative weightings (and or apply an alternative overall contrast score equation).

In other embodiments, application 132 may be configured to calculate fragment pair contrast scores for text and non-text fragments in the same way. In this case, application 132 may be further configured to calculate a solution's overall contrast score in a way that does not distinguish between text and non-text fragments—for example as a straight average of all combined fragment contrast scores.

Calculation of the solution's overall contrast score is then complete.

Example Fragment Pair Contrast Score for Non-Text Fragment/Background Fragment Pair At 1010 above, application 132 calculates a fragment pair contrast score for a selected (or foreground) fragment (selected at 1002) and one of its background fragments (selected at 1008).

This section describes example calculations for calculating a fragment pair contrast score where the selected/foreground fragment is a non-text fragment. This may also be referred to as calculating a non-text fragment pair contrast score.

In the present embodiments, the non-text fragment pair contrast score for a given pair of fragments (e.g. a foreground non-text fragment and one of the foreground fragment's background fragments) is calculated using a fragment pair contrast equation that provides for a weighted mix of the L, a* and b* channels from the CIELAB (Lab) colour space.

In the present embodiments, the L channel is weighted most heavily. The fragment pair contrast equation is further defined so that the fragment pair contrast score tapers off asymptotically. The equation is defined in this way as the inventors have identified that, in many cases, contrast provides diminishing utility beyond a certain point. On this basis, the fragment pair contrast equation is defined so that it does not reward unnecessary contrast that the optimizer might achieve at the expense of contrast elsewhere (or other objectives). Furthermore, having the fragment pair contrast score always increasing, if even by a small amount, encourages more consistency in the colour choice of the optimizer. That is, elements with the same colour background will tend to end up with the same colour too. If there was an exact maximum score and multiple colours could reach it, then potentially undesirable consequences could result, for example three different elements with the same background yet different colours.

By way of specific example, application 132 may be configured to calculate the fragment pair contrast score for a foreground fragment and a particular background fragment according to an equation such as:

Non-text fragment pair contrast=$x*\arctan(y*|l1-l2|+|a1-a2|+|b1-b2|)$

Where:

L1, a1, b1=Lab colour space L*, a*, and b* values of (e.g.) the foreground fragment; and L2, a2, b2=Lab colour space L*, a*, and b* values of (e.g.) a background fragment.

Various values of multipliers x and y may be adopted. By way of example, values of x=0.6 and y=4 may be suitable.

In this example, the '0.6*arc tan' term provides for a curve that starts at 0 and asymptotically approaches 1. For ease of description this example calculates taxicab (or rectilinear) distance between the two colours, however an alternative distance (e.g. Euclidian) could be used.

In alternative implementations, application 132 could be configured to calculate fragment pair contrast scores based purely on luminance differences (as described, for example, in the Web Content Accessibility Guidelines (WCAG) 2.1.). The inventors have determined, however, that in many cases calculating contrast based using pure luminance can give worse results for viewers who are not truly black/white colour blind (a relatively rare condition). This is because the constraints of applying an arbitrary colour palette to an arbitrary design means that it is often not possible to obtain a result that truly complies with the WCAG contrast guidelines. In this case it is necessary to choose a non-compliant result—e.g. the least bad result.

If required, colours may be converted from an original colour space value to the Lab colour space by use of a known algorithm or library.

Example Fragment Pair Contrast Score for Text Fragment/ Background Fragment Pair This section describes example calculations for calculating a fragment pair contrast score where the selected fragment (i.e. the fragment selected at 1002) is a text fragment. This may also be referred to as calculating a text fragment pair contrast score.

In the present example, the application 132 calculates a text fragment pair contrast score according to the following equation:

Text fragment pair contrast=(fragment pair WCAG contrast score+$x$*fragment pair base contrast score*legibility score)/$y$ Various values of multiplier x and divisor y may be adopted. By way of example, values of x=5 and y=6 may be suitable.

Furthermore, in alternative implementations the terms of the text fragment pair contrast equation may be combined in alternative ways, one or more terms may be omitted, and/or additional terms may be considered. As one example, while the above equation takes into account a fragment pair WCAG contrast score term this may be omitted (or altered) in alternative implementations.

Examples of each of these terms will be described below.

Example Fragment Pair WCAG Contrast Score Calculation

In the present example, application 132 is configured to calculate the WCAG contrast score for a given pair of fragments (e.g. a foreground fragment and one of the foreground fragment's background fragments) according to WCAG technique guideline G17. In this example, application 132 calculates the WCAG score for a subject text fragment then normalises that score into a range of zero to one. For example:

var wcagContrast=Difference·wcagContrast(color1, color2);

wcagContrast=(wcagContrast−1)/(wcagContrast+1)

Example Fragment Pair Base Contrast Score Calculation

In the present example, application 132 calculates the fragment pair base contrast score in the same way it calculates non-text fragment pair contrast scores (described above). E.g.:

Fragment pair base contrast=$x*\arctan(y*|l1-l2|+|a1-a2|+|b1-b2|)$

Alternative approaches to calculating a base contrast for a foreground text fragment and background fragment are possible.

Example Legibility Score Calculation

In the present example, the legibility score acts a penalty in the event application 132 detects one or more legibility issues.

Generally speaking, a legibility issue indicates that the legibility of the text may be compromised when recoloured according to the recolouring solution being scored. Where application 132 determines that a legibility issue does apply to a text fragment it penalises the contrast score for that text fragment.

In the present embodiment, the legibility penalty is implemented by providing a legibility score that has an initial value of 1 (i.e. no penalty). The legibility score is then reduced if one or more legibility issues are identified for the selected/foreground fragment.

The following describes a number of legibility issues by way of example. Application 132 may be configured to attempt to identify all of these legibility issues, a subset of these issues, additional issues, and/or alternative legibility issues (and/or apply the example legibility penalties or alternative penalties).

Generally speaking, each legibility issue has associated legibility criteria and an associated legibility penalty. When calculating the text fragment pair contrast score for a subject/foreground text fragment, application 132 determines whether the legibility criteria associated with a legibility issue apply and, if so, adjust the legibility score based on the legibility penalty associated with the applicable criteria. In the present examples the legibility issues are not mutually exclusive.

Example Legibility Penalty: Size/Saturation

In certain implementations, application 132 is configured to apply a legibility penalty to a text fragment if the solution results in that fragment having small text with highly saturated colours (as such text is typically hard to read and can look odd). This will be referred to as a size/saturation legibility penalty.

To determine whether the size/saturation legibility penalty applies to a subject text fragment, application 132 tests that text fragment against size/saturation penalty criteria. If the text fragment satisfies the size/saturation penalty criteria, a legibility penalty is applied for that fragment. In the present example, the size/saturation legibility penalty is a value of 0.2 (e.g. if the penalty applies, the legibility score is reduced by 0.2). Alternative penalty values may be used.

The size/saturation penalty criteria may be that a text fragment defines text with a font size that is less than a defined threshold font size and a saturation that exceeds a defined threshold saturation.

The defined threshold font size may be any appropriate value, for example 90px (67.5 points). Alternative threshold font sizes are possible. Further, in certain implementations the threshold font size may be defined as a function (e.g. a % of) of the page dimensions.

The defined threshold saturation may be any appropriate value. In the present example, the colour is converted to the HCLab colour space (which is the Lab colour space value transformed to have Hue Chroma and Luminance dimensions) and application 132 checks if the Chroma value is >85.

Example Legibility Penalty: Saturation/Saturation

In addition, or alternatively, application 132 may be configured to apply a legibility penalty where a solution results in text fragment that has saturated text against a saturated background fragment (which can generate a vibrating visual effect). This will be referred to as a saturation/saturation legibility penalty.

To determine the saturation/saturation legibility penalty, application 132 tests the text fragment/background fragment pair against saturation/saturation penalty criteria. If the pair satisfies the saturation/saturation penalty criteria, a legibility penalty is applied for that text fragment/background fragment pair. The penalty may, for example, be a value of 0.2 (e.g. if the penalty applies, the legibility score is reduced by 0.2). Alternative penalty values may be used.

As one example, the saturation/saturation penalty criteria may be that a text fragment's saturation exceeds a defined maximum saturation and any of that text fragment's background fragments also exceed the defined maximum saturation.

The defined maximum saturation may be any appropriate value, and may be the same or different to the maximum saturation value defined for the size/saturation legibility penalty. Further, the defined maximum saturation value may be the same for the text fragment in question and its background fragments or different maximum saturation values may be defined. By way of example, however, application 132 may be configured so that the maximum saturation is a Chroma value of greater than 85.

Example Legibility Penalty: Opposite Colour

In addition, or alternatively, application 132 may be configured to apply a legibility penalty if a text fragment defines text that is less than a threshold text size (e.g. 90px or an alternative defined value) and the colour of the text fragment is opposite (or approximately opposite) the colour of the background fragment being considered. This may be referred to as an opposite colour penalty. In this case, application 132 may, for example, apply a penalty of 0.03 (e.g. reduced the legibility score by 0.03).

Application 132 may take into account a tolerance when determining whether two colours are opposite—for example determining two colours are opposite if they are within x degrees of being opposite one another—e.g.:

$$\text{Math}\cdot\text{abs}(180-\text{colour hue difference}) < x$$

The tolerance x may, for example, be set to 30 degrees (though alternative values are possible).

Example Legibility Penalty: Red/Blue

Additionally, or alternatively, application 132 may be configured to apply a legibility penalty if a text fragment defines text that is less than a threshold text size (e.g. 90px or an alternative defined value) and the text fragment and background fragment in question provide a red/blue colour combination. This may be referred to as a red/blue penalty. In this case, application 132 may, for example, apply a penalty of 0.03 (e.g. reduced the legibility score by 0.03).

Application 132 may determine a red/blue colour combination in various ways, for example if: both the text fragment and background fragment colours have a Chroma of above 50; one of the text fragment or background fragment is determined to be red (e.g. (HCLab hue<60||HCLab hue>310)); and the other of the text fragment or background fragment is determined to be blue (e.g. (260<HCLab hue && HCLab hue<310)).

Example Legibility Penalty: Red Text

Additionally, or alternatively, application 132 may be configured to apply a legibility penalty if a text fragment defines text that is less than a threshold text size (e.g. 90px or an alternative defined value) and the text fragment defines red text with Chroma >90 on a background fragment that has luminance between 32 and 75. This may be referred to as a red text penalty. In this case, application 132 may, for example, apply a penalty of 0.05 (e.g. reduce the legibility score by 0.05).

Example Legibility Penalty: Blue Text

Additionally, or alternatively, application 132 may be configured to apply a legibility penalty if a text fragment defines text that is less than a threshold text size (e.g. 90px or an alternative defined value), has a Chroma value >50, and is blue (e.g. (260<HCLab hue && HCLab hue<310). In this case, application 132 may, for example, apply a penalty of 0.03 (e.g. reduced the legibility score by 0.03). This may be referred to as a blue text penalty, and is applied on the basis that blue cones are the least plentiful in the human fovea and as such the colour blue is typically seen with the least acuity.

Combined Vector Graphic Luminance Objective

In the present example, application 132 is configured to take a combined vector graphic luminance objective into account in a solution's final score.

Accordingly, at 906 application 132 calculates a combined vector graphic luminance score. This section provides an example approach to calculating a combined vector graphic luminance score.

The combined vector graphic luminance score is based on luminance scores that are calculated for each complex vector graphic element in the design. In this context, a complex vector graphic element is a vector graphic element that defines more than one colour.

To calculate the luminance score for a subject complex vector graphic element, application 132 calculates normalised original luminance values for the vector graphic and normalised recoloured luminance values for the vector graphic.

The normalised original luminance values are calculated by: determining all colours defined by the original version of the vector graphic (i.e. before recolouring); calculates the Lab colour space luminance value for each of those colours; and normalises each luminance value to a value between 0 and 1 (a given luminance value normalised, for example, by (original luminance value−min luminance value)/(max luminance value−min luminance value)). The normalised recoloured luminance values for the vector graphic are calculated in the same way, however use the colours defined for the vector graphic by the recolouring solution.

To calculate the luminance score for the vector graphic, application 132 then: calculates the differences between corresponding pairs of luminance values (i.e. corresponding values from the normalised original and normalised recoloured luminance values); sums the absolute values of those individual differences; and multiplies the sum by −1.

To illustrate this, consider a complex vector graphic defining four distinct colours. The raw original luminance values may be [40, 40, 50, 80], leading to normalised original luminance values of [0, 0, 0.25, 1]. The raw recoloured luminance values may be [34, 55, 70, 10], leading to normalised recoloured luminance values of [0.4, 0.75, 0, 1]. The difference between corresponding pairs=[|(0.4−0)|, |(0.75−0)|, |(0−0.25)|, |(1−1)|]. The sum of the differences=0.4+0.75+0.25+0. The final luminance score for the vector graphic is (−1*1.4)=−1.4.

Once luminance scores are calculated for each complex vector graphic, application 132 calculates the combined vector graphic luminance score as the average of the individual vector graphic luminance scores.

Fallback Colour Usage Objective

In the present example, application 132 is configured to take a fallback colour usage objective into account in a solution's final score.

Accordingly, at 908 application 132 calculates a fallback colour usage score. This score serves to penalise the use of fallback colours in a solution.

A fallback colour score may be calculated in various ways. In the present embodiment, application 132 calculates the fallback colour usage score by calculating the percentage of fragments which use a fallback colour and multiplying that percentage by a fallback colour penalty value. By way of example, the fallback colour penalty value may be −0.15 (though alternative values may be used).

Prominent Fragment Objective

In the present example, application 132 is configured to take a prominent fragment objective into account in a solution's final score.

Accordingly, at 910 application 132 calculates a prominent fragment score.

In the present context, the prominent fragment of a design is the largest recolourable fragment of the design. This will be the background fragment if the background fragment is recolourable.

The prominent fragment score is calculated based on whether a solution recolours the prominent fragment of the design using the prominent colour (as determined when generating the initial generation of solutions at 506) or a fallback colour.

In particular, application 132 is configured to determine: a positive prominent fragment score (i.e. a reward, e.g. a value of 0.3) if the prominent fragment is the prominent colour; a negative prominent fragment score (i.e. a penalty, e.g. a value of −0.3) if the prominent fragment is a fallback colour; a neutral prominent fragment score (e.g. a value of 0) if the prominent fragment is neither the prominent colour nor or a fallback colour.

Colour Shuffling

In certain embodiments, application 132 may provide a mechanism for a user to shuffle the colours of a design—i.e. to recolour the design using current design colours, but assigning those colours to different design fragments. An example method 1200 for doing so will be described with reference to FIG. 10. Method 1200 may, for example, follow recolouring the design at 516 of method 500.

At 1202, application 132 detects a shuffle trigger event. In the present embodiments, activation of a shuffle control such as 342 is a shuffle event, however alternatives are possible.

At 1204, application 132 selects a new prominent colour from the colour option palette generated for the design. Application 132 may be configured to do so in various ways.

For example, application 132 may sequentially iterate through the colours of the colour option palette so that the first colour of the colour option palette is selected at 506 when recolouring is first performed, the second colour of the colour option palette is selected the first time a shuffle is triggered, the third colour of the colour option palette is selected the next time a shuffle is triggered and so forth (returning to the first colour of the colour option palette once all colours have been used). As an alternative example, application 132 may randomly select a colour from the colour option palette that is not the current prominent colour.

At 1206, application 132 determines a new recolouring solution for the design. To do so, application 132 may generate a new set of potential solutions (e.g. as per operations 506 to 512) using the original colour option palette but taking into account the new prominent colour (selected at 1204) when scoring those solutions. This will in all likelihood lead to a different optimal solution being selected (as per 514). Notably, the new solution is determined using the original colour option palette generated for the design. Therefore, while the colours used for specific design fragments will likely change the colours used to recolour the design as a whole will not.

At 1208, application 132 renders the recoloured (shuffled) design. This may be as per 516 described above.

In the embodiments described above, application 132 determines fragment groups with reference to fragment colours. For example, at 704 a matching fragment group is a fragment group that is associated with the same colour and type as those of the current fragment. In alternative embodiments, application 132 may determine that a fragment's colour and fragment group colour match even if they are not exactly the same colour (i.e. do not have exactly the same RGB/other colour space value).

For example, at 704 application 132 may be configured to determine that a fragment's colour matches a fragment group's colour if the two colours are within the threshold colour distance of each other (the colour distance being, for example, the Euclidean distance between the RGB or LAB colour space values of the two colours). If the two colours match (and there is also a type match), application 132 will associate the fragment with that fragment group at 710. In this case, application 132 additionally calculates and stores a fragment transformation which reflects/maps fragment's colour to the group's colour (or vice versa). The fragment transformation may be stored or associated with the fragment and the group—for example, by storing a (fragment ID, fragment transformation) tuple in the fragment group data instead of only the fragment ID. E.g.:

| Group ID | Group fragments | Group colour | Group type |
|---|---|---|---|
| 1 | [1, (2, <transformation>)] | Blue | Text |

In this example, fragment group 1 is associated with the colour blue and with fragments 1 and 2. Fragment 1 (which does not define a transformation) has the same colour as the group colour. Fragment 2, however, does include a transformation which indicates that fragment 2's colour is not exactly the same as the group colour, and which can be used to transform the fragment from the group colour to its actual colour.

When the design is recoloured, the fragment transformation may then be used to transform the fragment colour from the colour defined for the fragment's group in the solution in question to an actual fragment colour to be used for recolouring. For example, the colour associated with group 1 above may be a light blue and the original colour of fragment 2 may be a slightly darker blue. In this case the transformation can be applied to the light blue colour of the group to get to the darker blue of the fragment. If a solution then defines that group 1 is to be coloured a particular shade of green: fragment 1 (with no transformation) will be coloured that particular shade of green, while fragment 2 will be transformed (via the transformation) to a different (in this case darker) shade of green.

Design, Design Element, and Design Element Group Scoring

As described above, method 500 provides techniques that can be used to automatically recolour a design. The various techniques described herein can, however, be used (or be adapted to be used) in other circumstances.

Figure 13:
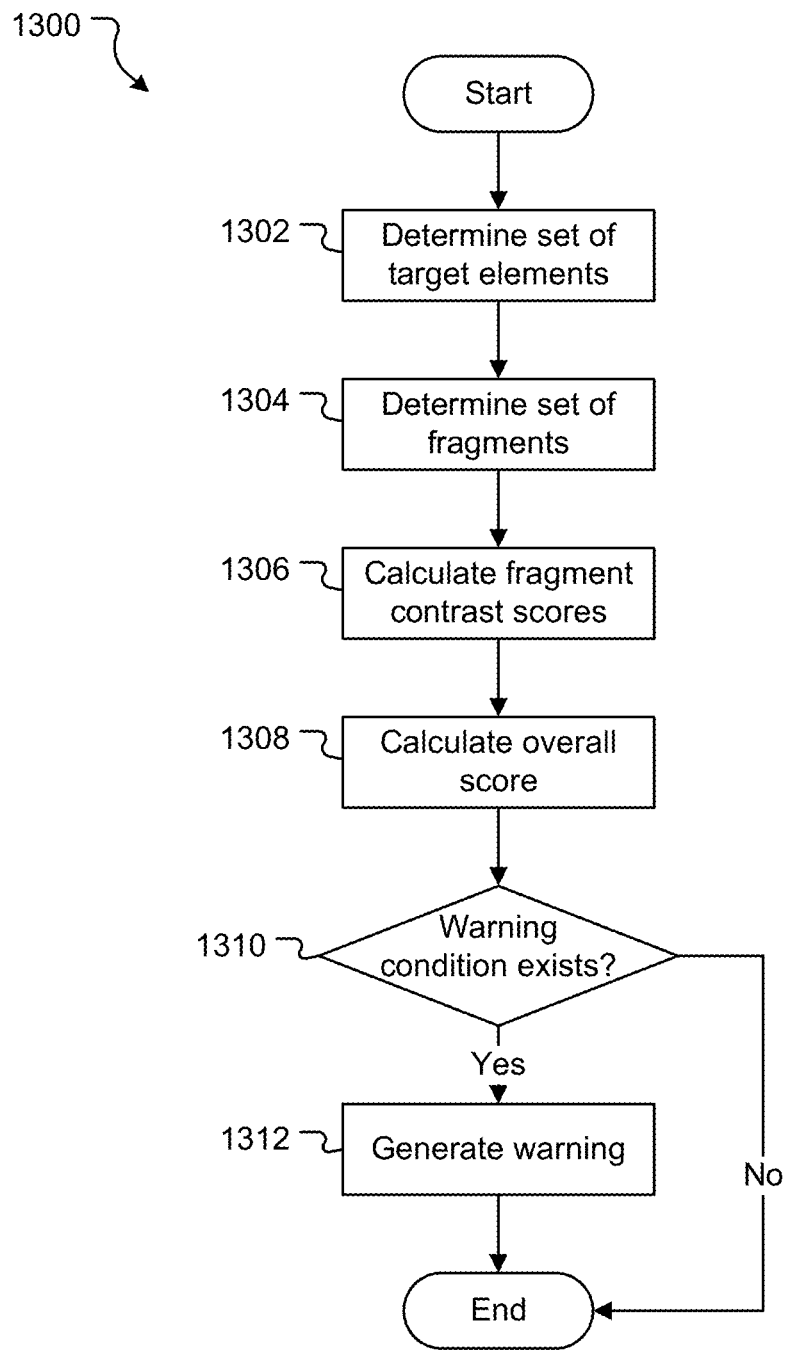
FIG. 13 depicts operations performed to score a set of one or more design elements.

As one particular example, the techniques described herein can be used to calculate a score for a set of one or more design elements. That score can then be used to trigger feedback (to either a human or programmatic user) regarding the set of design elements. An example method 1300 for scoring a set of one or more design elements and triggering feedback will be described with reference to FIG. 13.

The operations of method 1300 will be described as being performed by the client application 132 (shortened to application 132) running client system 130. In alternative embodiments, however, the processing described may be performed by (or in conjunction with) one or more alternative applications running on client system 130 and/or other computer processing systems.

Method 1300 operates on design data that describes design elements. One example of design data is described above, thought alternatives are possible. By way of example, method 1300 may operate on design data in respect of a design that is displayed in a user interface such as GUI 300 described above.

Method 1300 may be triggered various ways.

For example, application 132 may detect user selection one or more design elements followed by activation of a user interface control (e.g. a 'score selected element(s)' type control) which triggers method 1300. A user may select elements in various ways, for example by contacting, clicking on, or otherwise selecting one or more design elements that are displayed in a user interface.

Figure 14:
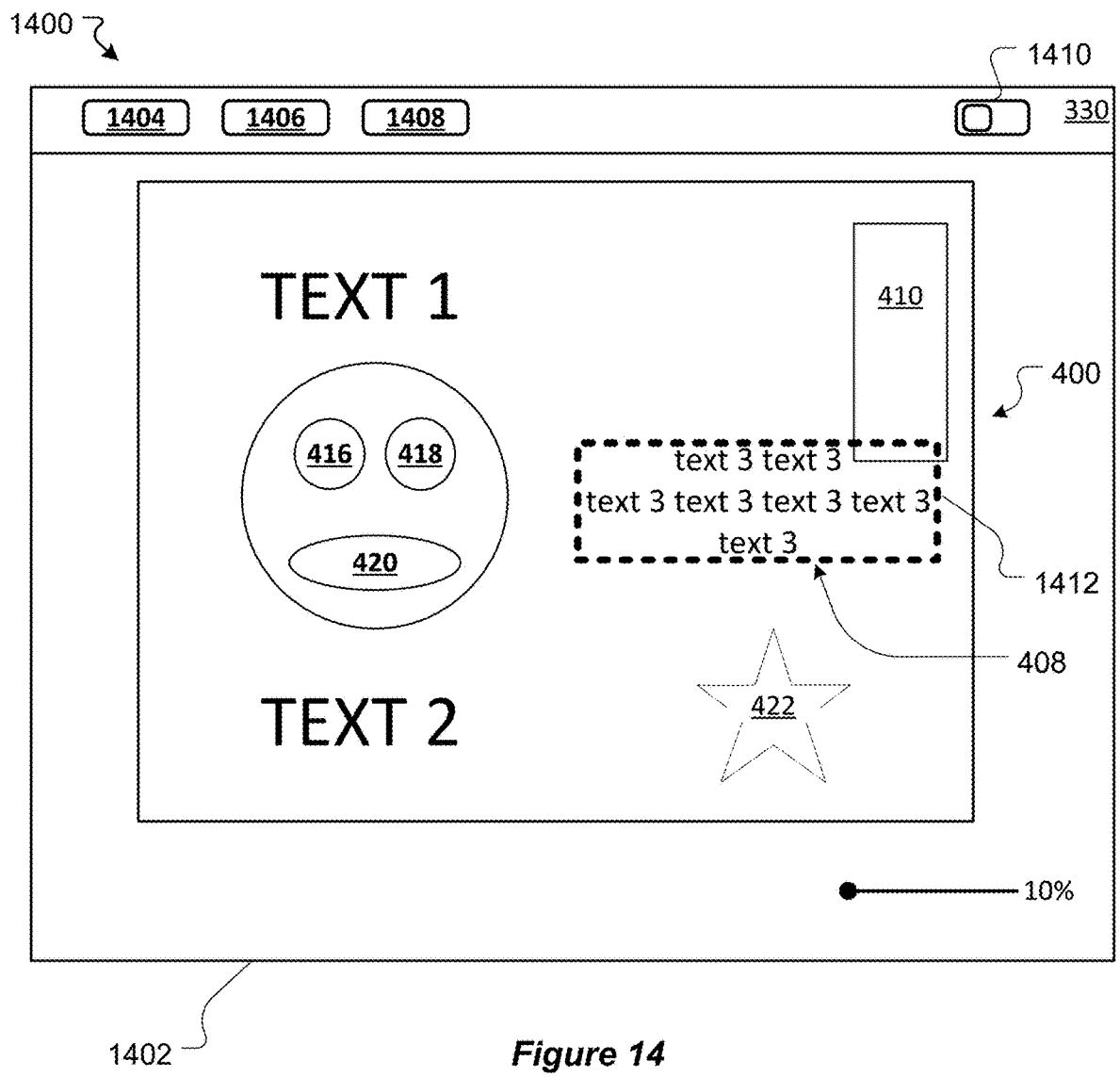
FIG. 14 depicts an example graphical user interface.

To illustrate this, FIG. 14 depicts an example graphical user interface 1400. GUI 1400 includes a preview area 1402 in which a design is being displayed. In this particular example the design being displayed is design 400 of FIG. 4. GUI 1400 also includes a 'score selected element(s)' control 1404, activation of which (following selection of one or more design elements) triggers application 132 to perform method 1300.

Alternatively, application 132 may detect activation of a user interface control (e.g. a 'score individual elements' type control) which causes application 132 to automatically score each individual design element (and/or defined design element groups) within a design that is being created.

To illustrate this, GUI 1400 also includes a 'score individual elements' control 1406, activation of which also triggers application 132 to perform method 1300.

Further alternatively, application 132 may detect activation of a user interface control (e.g. a 'score design' type control) which causes application 132 to score the entire design (i.e. all design elements) as a single group.

To illustrate this, GUI 1400 also includes a 'score design' control 1408, activation of which also triggers application 132 to perform method 1300. (In the present example, scoring the entire design may also be achieved, for example, by a user selecting all elements of the design then activating control 1404)

Further alternatively, application 132 may be configured to automatically trigger method 1300 in respect of an element on determining that a relevant change has occurred in respect of that element. In the context, a relevant change to an element may be: a new element being added to a design; an existing element being relevantly modified (e.g. by having its colour, size, and/or position changed); an element that forms part of the background to an existing element being relevantly modified (which may cause application 132 to perform method 1300 multiple times, e.g. once in respect of foreground element and once in respect of the background element). Such configuration of application 132 may be a default configuration of application 132, or may be the result of an application setting which a user can toggle between automatically scoring design elements and not.

To illustrate this, GUI 1400 includes an 'automatically score elements' toggle 1410, which a user can switch between a first setting (in which application 132 triggers method 1300 when determining that a relevant change has occurred in respect of an element) and a second setting (in which application 132 does not detect relevant changes to elements and trigger method 1300).

At 1302, application 132 determines a set of target elements. The set of target elements includes one or more elements of the design which are to be scored as a group. In this context, elements being scored as a group indicates that a single score is calculated for the set of target elements. If the set of target elements includes a single element, a single score is calculated for that element. If a set of target elements includes multiple elements, a single score is calculated for that set of multiple elements. To illustrate this distinction, and in the context of the present example, activation of a 'score individual design elements' type control such as 1406 would result in application 132 calculating a score for each individual design element, while activation of a 'score design' type control such as 1408 would result in application 132 calculating a single score for the entire design.

The set of target elements may be determined in various ways.

For example, if method 1300 is triggered following a user (human or programmatic) selecting one or more design elements and then activating a 'score selected elements' type control (such as 1404 described above), the set of target elements will be the selected design element(s).

Alternatively, if method 1300 is triggered by activation of a 'score individual design elements' type control (such as control 1406 described above), application 132 will initiate an instance of method 1300 for each individual element of the design (and each time method 1300 is performed a different element of the design will be determined at 1302).

Alternatively, if method 1300 is triggered by activation of a 'score design' type control (such as control 1408 described above), application 132 determine that the set of target elements includes all elements of the design.

As a further example, if method 1300 is automatically triggered on determining a relevant change has occurred in respect of an element, the set of target elements will be the element in respect of which the relevant change has been detected.

At 1304, application 132 determines a set of fragments that relate to the set of target elements.

The set of fragments determined at 1304 include one or more primary fragments. For present purposes, a primary fragment is a fragment that is directly associated with an element in the set of target elements. A primary fragment may be directly associated with an element in the set of target elements by being an element in the set of target elements (for target elements that are non-composite elements) or a primary fragment may be directly associated with an element in the set of target elements by being a component of an element in the set of target elements (for target elements that are composite elements).

The set of target fragments will also include one or more secondary fragments. For present purposes, a secondary fragment is a fragment that is not a primary fragment but is a background fragment to a primary fragment. Determining background fragments for a selected primary fragment may, for example, be performed as discussed above with reference to 1004.

For example, and referring to example design 1100 of FIG. 11, if the set of target elements included element 1110, then the primary fragments would include the fragment of element 1110 only and the background fragments would be the fragment of 1108. Conversely, if the set of target elements was 1110 and 1108, the primary fragments would include the fragments of element 1110 and 1108 and the background fragments would be the fragments of elements 1104 and 1106.

In some cases, application 132 (or another application) may have already generated fragment records relating to the design (or set of target elements). In this case application 132 can access the fragment records that have already been generated. In other cases, application 132 may need to process the design data to generate design fragment records. This may be achieved, for example, according to a method such as method 600 described above.

At 1306, application 132 calculates a set of fragment contrast scores. The set of fragment contrast scores includes a fragment contrast score for each primary fragment in the set of fragments determined at 1304.

In the present embodiment, application 132 is configured to calculate the fragment contrast score for a given primary fragment as described above, e.g. by: determining the given primary fragment's background fragments (e.g. per 1004); calculating a set of fragment pair contrast scores for each primary fragment/background fragment pair (e.g. per 1006-1010); and calculating a fragment contrast score based on the set of fragment pair contrast scores (e.g. per 1012).

At 1308, application 132 calculates an overall score for the set of target elements.

Application 132 is configured to calculate the overall score based on the set of fragment contrast scores calculated at 1308.

Application 132 may be configured to calculate the overall score as described at 1016 above (or in a similar manner). For example, application 132 may calculate the overall score for the set of target elements may be calculated as:

Overall score=x*average fragment contrast scores of primary text fragments+y*average fragment contrast scores of primary non-text fragments.

Various weights x and y may, again, be used. For example, x=3 and y=1 may be suitable weights (though alternatives are possible).

Alternatively, application 132 may be configured to calculate text and non-text fragment scores in the same way. In this case, application 132 may calculate the overall score for the set of target elements in an alternative manner—for example as the average of the primary fragment contrast scores calculated at 1306.

In certain implementations, application 132 may be configured to incorporate a combined vector graphic luminance score into the overall score for the set of target elements. A combined vector graphic luminance score may be calculated, for example, as described above at 904. Where such a score is calculated, application 132 may be configured to incorporate this into the overall score for the set of target elements in various ways, for example by adding it to the score calculated based on the set of fragment contrast scores (as described above).

At 1310, application 132 determines, based on the overall score for the set of target elements, whether a warning condition exists. In the present example, this determination is made by comparing the overall score for the set of target elements (calculated at 1308) with a threshold value. In certain implementations (and depending on how the score is calculated) if the calculated score is less than the threshold value application 132 determines that a warning should be displayed. In other implementations application 132 determines that a warning should be displayed if the calculated score is greater than the threshold value. The specific value that is selected as the threshold value will depend on the specific calculations used to calculate individual fragment contrast scores (at 1306) and the overall score (at 1308).

If, at 1310, application 132 determines a warning condition exists, processing proceeds to 1312. If not processing ends.

At 1312, application 132 generates a warning. Application 132 may be configured to generate a warning in various ways.

For example, where method 600 is triggered while a user is viewing a design (via an appropriate user interface), application 132 may be configured to generate visual warning in respect of the set of target elements. The visual warning may involve visually distinguishing the element(s) in the set of target elements (or the set of target elements as a whole). By way of example, application 132 may cause: the element(s) in the set of target elements to flash; a partially transparent UI object to be displayed atop the element(s) in the set of target elements; an outline UI object that outlines the set of target elements to be displayed; a user interface element which displays warning information (e.g. the score calculated for the set of target elements, a text warning, a warning colour, or other warning information) in a way that allows a user to associate the UI element with the set of target elements; an alternative UI object that indicates the set of target elements to be displayed.

By way of example, FIG. 14 shows text element 408 with a visual warning—in this particular instance the visual warning being a heavy bounding box 1412 displayed around the text element 408 to visually distinguish it both from other elements of the design and from its actual appearance. Application 132 may display this bounding box 1412, for example, in response to: detecting a user selecting the 'score selected element' control 1404 following selection of text element 408; calculating an overall score for text element 408 according to operation 1302, 1304, 1306, and 1308; determining that a warning condition exists at 1310; then generating the warning (in this particular example bounding box 1412) at 1312.

In response to the warning, a user may, though need not, choose to edit one or more elements of the design (and may then be re-scored according to method 1300). User input dismissing the warning may be received (causing application 132 to cease displaying the warning) and/or application 132 may automatically cease displaying the warning after a defined interval.

In method 1300, application 312 determines whether a warning condition exists and, if so, generates a warning. In alternative embodiments, application 312 may instead (or additionally) return the overall score as calculated (or data based thereon) without determining if a warning condition exists. For example, Application 312 may simply display the calculated score to a user (in a way that allows the set of target elements that the score relates to be identified). As another example, where method 1600 is performed as part of a broader process, the calculated score may be returned or otherwise communicated to the relevant application or process.

Furthermore, while 1312 as described above indicates a binary warning condition, application 132 may be configured to determine additional warning conditions (and generate output accordingly). For example, application 132 may be configured to determine whether the overall score calculated at 1310 falls within one or more predefined ranges— e.g. a first range (set, for example, to indicate when it is highly likely that there is an issue with the visual appearance with the element(s) in the set of target elements), a second range (set, for example, to indicate when it is moderately likely that there is an issue with the visual appearance with the element(s) in the set of target elements), and a third range (set, for example, to indicate when it is not likely that there is an issue with the visual appearance with the element(s) in the set of target elements). In this case, application 132 may be configured to generate different (or no) warning depending on the range in which the calculated score falls—for example a first warning where the score falls within the first range (e.g. a flashing red overlay on the set of target elements), a second warning where the score falls within the second range (e.g. a flashing orange overlay on the set of target elements), and no warning where the score falls within the third range. Additional and/or alternative ranges and associated warnings are possible.

Clauses

Further examples of specific feature combinations taught within the present disclosure are set out in the following numbered clauses.

Clause 1. A computer implemented method for automatically recolouring a design, the method including:
  processing, by a computer processing unit, design data in respect of the design to generate design fragment data, the design fragment data including one or more design fragment records, each design fragment record corresponding to a fragment of the design;
  processing the design fragment data to generate fragment group data, the fragment group data including one or more fragment group records, each fragment group record defining a group of recolourable design fragments;
  generating a plurality of recolouring solutions, each recolouring solution defining a colour for each of the one or more fragment groups;
  calculating a solution score for each recolouring solution of the plurality of recolouring solutions;
  selecting an optimal recolouring solution based on the calculated solution scores; and
  recolouring the design in accordance with the selected recolouring solution.

Clause 2. The computer implemented method of clause 1, wherein calculating the solution score for a particular recolouring solution includes:
  calculating a set of fragment contrast scores, each fragment contrast score corresponding to a fragment of the design; and
  calculating an overall contrast score for the particular recolouring solution, the overall contrast score being calculated based on the set of fragment contrast scores.

Clause 3. The computer implemented method of clause 2, wherein calculating the set of fragment contrast scores includes:
  calculating one or more text fragment contrast scores, each text fragment contrast score being a fragment contrast score in respect of a text fragment of the design; and
  calculating one or more non-text fragment contrast scores, each non-text fragment contrast score being a fragment contrast score in respect of a non-text fragment of the design,
  and wherein
    calculating the overall contrast score includes applying a heavier weighting to the one or more text fragment contrast scores than to the one or more non-text fragment contrast scores.

Clause 4. The computer implemented method of clause 3, wherein calculating the overall contrast score for the particular recolouring solution includes:
  calculating an average text fragment contrast score based on the one or more text fragment contrast scores; and
  calculating an average non-text fragment contrast score based on the one or more non-text fragment contrast scores.

Clause 5. The computer implemented method of any one of clause 2 to 5, wherein calculating the fragment contrast score for a selected fragment of the design includes:
  calculating a set of fragment pair contrast scores for the selected fragment, the set of fragment pair contrast scores for the selected fragment including a fragment pair contrast score in respect of each fragment that is a background fragment to the selected fragment.

Clause 6. The computer implemented method of clause 5, wherein the calculating the fragment contrast score for the selected fragment includes combining the set of fragment pair contrast scores for the selected fragment in a way that gives additional weight to the worst fragment pair contrast score in the set of fragment pair contrast scores for the selected fragment.

Clause 7. The computer implemented method of clause 5 or clause 6, wherein calculating a fragment pair contrast score for a particular pair of fragments that includes a foreground fragment and a background fragment includes calculating the fragment contrast score based on a distance between a colour space value of the foreground fragment and a colour space value of the background fragment.

Clause 8. The computer implemented method of any one of clauses 5 to 7, wherein calculating the fragment pair contrast score for the particular pair of fragments further includes:
  determining whether the foreground fragment is a text fragment; and
  in response to determining the foreground fragment is a text fragment:
    calculating a legibility penalty; and
    calculating the fragment pair contrast score for the particular pair of fragments based on the legibility penalty.

Clause 9. The computer implemented method of clause 8, wherein calculating the legibility penalty includes determining whether one or more the legibility issues applies to the selected fragment, the one or more legibility issues selected from a group including: text with highly saturated colours; saturated text against a saturated background; red text against a blue background; blue text against a red background; red text; blue text.

Clause 10. The computer implemented method of any one of clauses 1 to 10, wherein calculating the solution score for the particular recolouring solution further includes:
- calculating a combined vector graphic luminance score; and
- calculating the solution score for the particular recolouring solution based on the combined vector graphic luminance score.

Clause 11. The computer implemented method of any one of clauses 1 to 10, wherein calculating the solution score for the particular recolouring solution further includes:
- calculating a fallback colour usage score; and
- calculating the solution score for the particular recolouring solution based on the combined vector graphic luminance score.

Clause 12. The computer implemented method of any one of clauses 1 to 11, wherein calculating the solution score for the particular recolouring solution further includes:
- calculating a prominent fragment score; and
- calculating the solution score for the particular recolouring solution based on the combined vector graphic luminance score.

Clause 13. The computer implemented method of any one of clauses 1 to 12, wherein generating the plurality of recolouring solutions includes generating an initial generation of recolouring solutions, each recolouring solution in the initial generation of recolouring solutions generated by selecting a colour for each fragment group from a colour options palette.

Clause 14. The computer implemented method of clause 13, wherein:
- generating the plurality of recolouring solutions further includes generating a further generation of recolouring solutions; and
- generating the further generation of recolouring solutions includes generating at least one solution by one of: selecting a solution from the initial generation of recolouring solutions; mutating a solution from the initial generation of recolouring solutions; breeding two or more solutions from the initial generation of recolouring solutions.

Clause 15. The computer implemented method of clause 13 or clause 14, further including generating the colour options palette by:
- selecting one or more colours from an input colour palette for inclusion in the colour options palette;
- determining that a fallback colour is required for the colour options palette;
- generating the fallback colour; and
- including the fallback colour in the colour options palette.

Clause 16. The computer implemented method of clause 15, wherein generating the fallback colour includes generating a luminance or brightness variant of a colour defined in the input colour palette.

Clause 17. The computer implemented method of any one of clauses 1 to 16, wherein processing the design fragment data to generate fragment group data includes grouping recolourable design fragments together based on one or more grouping attributes, the grouping attributes including design fragment colour and design fragment type.

Clause 18. The computer implemented method of any one of clauses 1 to 17, wherein each design fragment record corresponds to either a unitary design element or a component part of a composite design element.

Clause 19. A computer processing system including:
- a processing unit;
- a display; and
- a non-transient computer-readable storage medium storing instructions, which when executed by the processing unit, cause the processing unit to perform the method according to any one of clauses 1 to 18.

Clause 20. A non-transient storage medium storing instructions executable by processing unit to cause the processing unit to perform the method according to any one of clauses 1 to 18.

Clause 21. A computer implemented method including:
- accessing design data defining one or more design elements of a design;
- determining a set of target elements, the set of target elements including one or more of the design elements;
- determining a set of fragments, the set of fragments including one or more primary fragments and one or more background fragments, each primary fragment being a fragment that is directly associated with a design element in the set of target elements, each secondary fragment being a fragment that is a background fragment to a primary fragment;
- calculating, by a processing unit, a set of fragment contrast scores, the set of fragment contrast scores including a fragment contrast score for each primary fragment in the set of fragments; and
- calculating an overall score for the set of target elements based on the set of fragment contrast scores.

Clause 22. The computer implemented method of clause 21, further including
- comparing the overall score to a threshold score to determine whether a warning condition exists; and
- in response to determining that a warning condition exists, generating a warning.

Clause 23. The computer implemented method of clause 22, wherein generating the warning includes displaying a warning on a display.

Clause 24. The computer implemented method of clause 23, wherein generating the warning includes visually distinguishing the one or more elements in the set of target elements.

Clause 25. The computer implemented method of any one of clauses 21 to 24, wherein calculating the fragment contrast score for a selected primary fragment includes:
- calculating a set of fragment pair contrast scores for the selected primary fragment, the set of fragment pair contrast scores for the selected primary fragment including a fragment pair contrast score in respect of each fragment that is a background fragment to the selected primary fragment; and
- calculating the fragment contrast score for a selected primary fragment based on the set of fragment pair contrast scores calculated for the selected primary fragment.

Clause 26. The computer implemented method of clause 25, wherein calculating the fragment contrast score for a selected primary fragment includes combining the set of fragment pair contrast scores for the selected primary fragment in a way that gives additional weight to a worst fragment pair contrast score in the set of fragment pair contrast scores for the selected primary fragment.

Clause 27. The computer implemented method of clause 25 or clause 26, wherein calculating the fragment pair contrast score for a particular pair of fragments that includes a foreground fragment and a background fragment includes calculating the fragment pair contrast score based on a distance between a colour space value of the foreground fragment and a colour space value of the background fragment.

Clause 28. The computer implemented method of any one of clauses 21 to 27, wherein calculating the set of fragment contrast scores includes:
    calculating one or more text fragment contrast scores, each text fragment contrast score being a fragment contrast score in respect of a text fragment; and
    calculating one or more non-text fragment contrast scores, each non-text fragment contrast score being a fragment contrast score in respect of a non-text fragment,
and wherein
    calculating the overall contrast score includes applying a heavier weighting to the one or more text fragment contrast scores than to the one or more non-text fragment contrast scores.

Clause 29. The computer implemented method of clause 28, wherein calculating a text fragment contrast score for a selected text fragment includes calculating a legibility penalty.

Clause 30. The computer implemented method of clause 29, wherein calculating the legibility penalty includes determining whether one or more the legibility issues applies to the selected text fragment, the one or more legibility issues selected from a group including: text with highly saturated colours; saturated text against a saturated background; red text against a blue background; blue text against a red background; red text; blue text.

Clause 31. The computer implemented method of any one of clauses 21 to 30, further including:
    calculating a combined vector graphic luminance score; and
    calculating the overall score for the set of target elements based on the combined vector graphic luminance score.

Clause 32. A computer processing system including:
    a processing unit;
    a display; and
    a non-transient computer-readable storage medium storing instructions, which when executed by the processing unit, cause the processing unit to perform the method according to any one of clauses 21 to 31.

Clause 33. A non-transient storage medium storing instructions executable by processing unit to cause the processing unit to perform the method according to any one of clauses 21 to 31.

In the above embodiments, operations are described as being performed by the client system 130 (e.g. under control of the client application 132). Variations are, however, possible. For example in certain cases an operation described as being performed by client system 130 may be performed at the server environment 110. Generally speaking, however, where user input is required such user input is initially received at client system 130 (by an input device thereof). Data representing that user input may be processed by one or more applications running on client system 130 or may be communicated to server environment 110 for one or more applications running on the server hardware 112 to process. Similarly, data or information that is to be output by a client system 130 (e.g. via display, speaker, or other output device) will ultimately involve that system 130. The data/information that is output may, however, be generated (or based on data generated) by client application 132 and/or the server environment 110 (and communicated to the client system 130 to be output).

Furthermore, in certain implementations a computer processing system 200 may be configured (by an application running thereon) to perform the processing described herein entirely independently of a server environment 110. In this case, the application running on that system is a stand-alone application and all instructions and data required to perform the operations described above are stored on that system.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

Although the present disclosure uses terms "first," "second," etc. to describe various elements, these terms are (unless explicitly stated otherwise) used only to distinguish elements from one another and not in an ordinal sense. For example, unless stated otherwise a first feature (e.g. a first colour, a first element, a first fragment) could be termed a second feature (e.g. a second colour, a second element, a second fragment) or vice versa without departing from the scope of the described examples. Furthermore, when used to differentiate elements or features, a second feature could exist without a first. For example, a second user input could occur before a first user input (or without a first user input ever occurring).

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method including:
    accessing design data defining one or more design elements of a design;
    determining a set of target elements, the set of target elements including one or more of the design elements;
    determining a set of fragments, the set of fragments including one or more primary fragments and one or more background fragments, each primary fragment being a fragment that is directly associated with a design element in the set of target elements, each secondary fragment being a fragment that is a background fragment to a primary fragment;

calculating, by a processing unit, a set of fragment contrast scores, the set of fragment contrast scores including a fragment contrast score for each primary fragment in the set of fragments;

calculating an overall score for the set of target elements based on the set of fragment contrast scores;

comparing the overall score to a threshold score to determine whether a warning condition exists; and in response to determining that a warning condition exists, generating a warning, wherein generating the warning includes visually distinguishing the one or more elements in the set of target elements.

2. The computer implemented method of claim 1, wherein calculating the fragment contrast score for a selected primary fragment includes:

calculating a set of fragment pair contrast scores for the selected primary fragment, the set of fragment pair contrast scores for the selected primary fragment including a fragment pair contrast score in respect of each fragment that is a background fragment to the selected primary fragment; and calculating the fragment contrast score for a selected primary fragment based on the set of fragment pair contrast scores calculated for the selected primary fragment.

3. The computer implemented method of claim 2, wherein calculating the fragment contrast score for a selected primary fragment includes combining the set of fragment pair contrast scores for the selected primary fragment in a way that gives additional weight to a worst fragment pair contrast score in the set of fragment pair contrast scores for the selected primary fragment.

4. The computer implemented method of claim 2, wherein calculating the fragment pair contrast score for a particular pair of fragments that includes a foreground fragment and a background fragment includes calculating the fragment pair contrast score based on a distance between a colour space value of the foreground fragment and a colour space value of the background fragment.

5. The computer implemented method of claim 1, wherein calculating the set of fragment contrast scores includes:

calculating one or more text fragment contrast scores, each text fragment contrast score being a fragment contrast score in respect of a text fragment; and calculating one or more non-text fragment contrast scores, each non-text fragment contrast score being a fragment contrast score in respect of a non-text fragment, and wherein calculating the overall contrast score includes applying a heavier weighting to the one or more text fragment contrast scores than to the one or more non-text fragment contrast scores.

6. The computer implemented method of claim 5, wherein calculating a text fragment contrast score for a selected text fragment includes calculating a legibility penalty.

7. The computer implemented method of claim 1, further including:

calculating a combined vector graphic luminance score; and calculating the overall score for the set of target elements based on the combined vector graphic luminance score.

8. A computer processing system including:
a processing unit;
a display; and
a non-transient computer-readable storage medium storing instructions, which when executed by the processing unit, cause the processing unit to perform a method including accessing design data defining one or more design elements of a design;

determining a set of target elements, the set of target elements including one or more of the design elements;

determining a set of fragments, the set of fragments including one or more primary fragments and one or more background fragments, each primary fragment being a fragment that is directly associated with a design element in the set of target elements, each secondary fragment being a fragment that is a background fragment to a primary fragment;

calculating, by a processing unit, a set of fragment contrast scores, the set of fragment contrast scores including a fragment contrast score for each primary fragment in the set of fragments;

calculating an overall score for the set of target elements based on the set of fragment contrast scores;

comparing the overall score to a threshold score to determine whether a warning condition exists; and in response to determining that a warning condition exists, generating a warning, wherein generating the warning includes visually distinguishing the one or more elements in the set of target elements.

9. The computer processing system of claim 8, wherein calculating the fragment contrast score for a selected primary fragment includes:

calculating a set of fragment pair contrast scores for the selected primary fragment, the set of fragment pair contrast scores for the selected primary fragment including a fragment pair contrast score in respect of each fragment that is a background fragment to the selected primary fragment; and calculating the fragment contrast score for a selected primary fragment based on the set of fragment pair contrast scores calculated for the selected primary fragment.

10. The computer processing system of claim 9, wherein calculating the fragment pair contrast score for a particular pair of fragments that includes a foreground fragment and a background fragment includes calculating the fragment pair contrast score based on a distance between a colour space value of the foreground fragment and a colour space value of the background fragment.

11. The computer processing system of claim 8, wherein calculating the set of fragment contrast scores includes:

calculating one or more text fragment contrast scores, each text fragment contrast score being a fragment contrast score in respect of a text fragment; and calculating one or more non-text fragment contrast scores, each non-text fragment contrast score being a fragment contrast score in respect of a non-text fragment, and wherein calculating the overall contrast score includes applying a heavier weighting to the one or more text fragment contrast scores than to the one or more non-text fragment contrast scores.

12. The computer processing system of claim 11, wherein calculating a text fragment contrast score for a selected text fragment includes calculating a legibility penalty.

13. The computer processing system of claim 8, further including:

calculating a combined vector graphic luminance score; and calculating the overall score for the set of target elements based on the combined vector graphic luminance score.

14. A non-transient storage medium storing instructions executable by processing unit to cause the processing unit to perform a method including accessing design data defining one or more design elements of a design;

determining a set of target elements, the set of target elements including one or more of the design elements;

determining a set of fragments, the set of fragments including one or more primary fragments and one or more background fragments, each primary fragment being a fragment that is directly associated with a design element in the set of target elements, each secondary fragment being a fragment that is a background fragment to a primary fragment;

calculating, by a processing unit, a set of fragment contrast scores, the set of fragment contrast scores including a fragment contrast score for each primary fragment in the set of fragments;

calculating an overall score for the set of target elements based on the set of fragment contrast scores;

comparing the overall score to a threshold score to determine whether a warning condition exists; and in response to determining that a warning condition exists, generating a warning, wherein generating the warning includes visually distinguishing the one or more elements in the set of target elements.

* * * * *